United States Patent
Takano

(10) Patent No.: US 10,904,546 B2
(45) Date of Patent: Jan. 26, 2021

(54) MOVING IMAGE PROCESSING DEVICE, MOVING IMAGE PROCESSING METHOD, AND RECORDING MEDIUM HAVING MOVING IMAGE PROCESSING PROGRAM STORED THEREON

(71) Applicant: NEC Corporation, Tokyo (JP)

(72) Inventor: Fumiyo Takano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/499,902

(22) PCT Filed: Apr. 5, 2018

(86) PCT No.: PCT/JP2018/014591
§ 371 (c)(1),
(2) Date: Oct. 1, 2019

(87) PCT Pub. No.: WO2018/190242
PCT Pub. Date: Oct. 18, 2018

(65) Prior Publication Data
US 2020/0120352 A1    Apr. 16, 2020

(30) Foreign Application Priority Data
Apr. 10, 2017   (JP) .................................. 2017-077532

(51) Int. Cl.
*H04N 19/436*     (2014.01)
*H04N 19/159*     (2014.01)
(Continued)

(52) U.S. Cl.
CPC ......... *H04N 19/436* (2014.11); *H04N 19/159* (2014.11); *H04N 19/176* (2014.11); *H04N 19/423* (2014.11); *H04N 19/46* (2014.11)

(58) Field of Classification Search
None
See application file for complete search history.

(56) References Cited

U.S. PATENT DOCUMENTS

| 9,547,880 B2* | 1/2017 | Yuan ................... G06F 15/8007 |
| 2006/0093042 A1 | 5/2006 | Kashima et al. |

(Continued)

FOREIGN PATENT DOCUMENTS

| JP | 2006-129284 A | 5/2006 |
| JP | 2008-283612 A | 11/2008 |

(Continued)

OTHER PUBLICATIONS

"Overview of Information Source Encoding Unit H.264 ↑ MPEG-4 AVC Standard", Feb. 24, 2006, [Online], [searched on Mar. 29, 2017], Internet <URL: http://www.soumu.go.ip/main_sosiki.ioho_tsusin/policyreports/ioho_tsusin/bunkakal/pdf/060720_3_1-2_sa2.pdf>, 90 pages.

(Continued)

*Primary Examiner* — Christopher G Findley

(57) ABSTRACT

A moving image processing device includes: a storage unit storing, by dividing an image into pixel blocks and performing image processing for the individual pixel blocks, an execution state of image processing for each pixel block in encoding or decoding processing for the image; a determination unit determining whether image processing for a first pixel block is executable, based on an execution state of image processing for a second pixel block for which image processing for the first pixel block has a dependence regarding a processing order; and an execution unit performing, in parallel or pseudo-parallel, image processing for the first pixel blocks for which image processing is determined to be executable by the determination unit, and updating an execution state of image processing for the first pixel block, whereby encoding or decoding processing for a moving image is accelerated.

8 Claims, 18 Drawing Sheets

(51) Int. Cl.
*H04N 19/176* (2014.01)
*H04N 19/423* (2014.01)
*H04N 19/46* (2014.01)

(56) References Cited

U.S. PATENT DOCUMENTS

| | | |
|---|---|---|
| 2009/0034615 A1 | 2/2009 | Yano |
| 2010/0239024 A1 | 9/2010 | Chikamura et al. |
| 2015/0091927 A1* | 4/2015 | Cote .................... G06T 1/20 |
| | | 345/547 |
| 2016/0049839 A1 | 2/2016 | Paiva et al. |
| 2016/0205408 A1 | 7/2016 | Shibata |
| 2018/0234681 A1* | 8/2018 | Fu ....................... H04N 19/182 |

FOREIGN PATENT DOCUMENTS

| | | |
|---|---|---|
| JP | 2009-038501 A | 2/2009 |
| JP | 2010-041115 A | 2/2010 |
| WO | 2009/063646 A1 | 5/2009 |
| WO | 2015/045276 A1 | 4/2015 |

OTHER PUBLICATIONS

International Search Report dated Jul. 10, 2018 issued by the International Searching Authority in International Application No. PCT/JP2018/014591.

Written Opinion dated Jul. 10, 2018 issued by the International Searching Authority in International Application No. PCT/JP2018/014591.

* cited by examiner

Fig. 18

|   | 1 | 2 | 3 | 4 | 5 | 6 |
|---|---|---|---|---|---|---|
| 1 | 1 | 2 | 3 | 4 | 5 | 6 |
| 2 | 3 | 4 | 5 | 6 | 7 | 8 |
| 3 | 5 | 6 | 7 | 8 | 9 | 10 |
| 4 | 7 | 8 | 9 | 10 | 11 | 12 |

MOVING IMAGE PROCESSING DEVICE, MOVING IMAGE PROCESSING METHOD, AND RECORDING MEDIUM HAVING MOVING IMAGE PROCESSING PROGRAM STORED THEREON

This application is a National Stage Entry of PCT/JP2018/014591 filed on Apr. 5, 2018, which claims priority from Japanese Patent Application 2017-077532 filed on Apr. 10, 2017, the contents of all of which are incorporated herein by reference, in their entirety.

TECHNICAL FIELD

The invention of the present application relates to a technique for dividing an image into a plurality of pixel blocks, and performing encoding processing or decoding processing for each of the divided pixel blocks.

BACKGROUND ART

In a standard specification relating to moving image encoding such as H.264/moving picture experts group (MPEG)-4 advanced video coding (AVC) (hereinafter, referred to as "H.264"), and H.265/high efficiency video coding (HEVC) (hereinafter referred to as "H.265"), an image is divided into a large number of pixel blocks (e.g. 16×16 pixel blocks, 4×4 pixel blocks, or the like), and encoding and decoding are performed for each of the pixel blocks.

In moving image encoding such as H.264, a prediction image is generated, based on timewise or spatial correlation, and information is compressed by encoding only information indicating a difference between an input image and the prediction image. An encoder for performing information compression processing as described above can select, from either inter-prediction or intra-prediction, an encoding type to which a prediction image generation method is designated. The inter-prediction is a method of generating a prediction image on the basis of pixels constituting a nearby frame, based on timewise correlation. On the other hand, the intra-prediction is a method of generating a prediction image on the basis of nearby pixels constituting a same frame, based on spatial correlation. For example, in intra-prediction conforming to H.264, processing is performed, according to a raster scan order, from a pixel block located on an upper left side within a frame. Specifically, in intra-prediction conforming to H.264, when a pixel value of a certain target pixel block is predicted, for example, processing is performed, based on pixel values of encoded or decoded pixel blocks located on a left side, an upper left side, an upper side, and an upper right side of the target pixel block. The pixel blocks are pixel blocks adjacent to a target pixel block for which encoding (or decoding) is not yet performed, and to be referred to when the target pixel block is encoded (or decoded). In the present application, the pixel blocks are hereinafter referred to as "reference adjacent blocks".

FIG. 17 is a block diagram conceptually illustrating a configuration of a general moving image decoding device 40 conforming to H.264 standard. The moving image decoding device 40 includes a variable length decoding unit 410, an inverse-transformation inverse-quantization unit 411, a loop filter 412, a frame buffer 413, an inter-prediction unit 414, and an intra-prediction unit 415.

The variable length decoding unit 410 decodes a bitstream of an input moving image. The inverse-transformation inverse-quantization unit 411 performs inverse quantization and then inverse transformation with respect to a signal decoded by the variable length decoding unit 410. The moving image decoding device 40 generates a restored image by adding a signal output by the inverse-transformation inverse-quantization unit 411, and a prediction image to be described later. The loop filter 412 outputs a decoded image being a result acquired by removing a block distortion in the generated restored image. The frame buffer 413 holds the restored image output from the loop filter 412.

The above-described prediction image is generated by the inter-prediction unit 414 or the intra-prediction unit 415. The inter-prediction unit 414 generates a prediction image by using a pixel of a decoded image held in the frame buffer 413. When processing with respect to a pixel block (inter-prediction block) as a processing target is performed, since the inter-prediction unit 414 does not refer to a pixel within a same frame, there is no dependence regarding a processing order among the inter-prediction blocks within the same frame. Therefore, the inter-prediction unit 414 can perform processing in highly parallel with respect to a plurality of inter-prediction blocks with no relation to (without depending on) a processing condition of the plurality of inter-prediction blocks.

On the other hand, the intra-prediction unit 415 generates a prediction image relating to a pixel block (intra-prediction block) as a processing target by using a pixel of a restored image included in a reference adjacent block. Specifically, there is a dependence regarding a processing order in which it is not possible to perform processing with respect to an intra-prediction block by the intra-prediction unit 415 until processing with respect to a reference adjacent block is completed. Therefore, expectation for a technique of accelerating encoding processing or decoding processing with respect to a moving image, even when there is a dependence as described above, is increasing.

As a technique associated with a technique as described above, PTL 1 discloses a device for performing encoding processing or decoding processing in parallel in the unit of a divided pixel block. The device starts processing from a pixel block at an upper left end within a frame, and manages whether processing with respect to each of pixel blocks is completed. The device searches for, when processing with respect to a certain pixel block is completed, a pixel block of which processing of pixel blocks located on a left side and an upper right side is completed, as a pixel block to be processed next, and repeats processing with respect to the searched pixel block. Since the device proceeds processing to a right direction from a pixel block at a left end, as far as it is possible to confirm that processing of a pixel block located on an upper right side is completed, it is possible to guarantee a relationship in which processing with respect to pixel blocks located on an upper left side and an upper side is completed.

Figure 18:
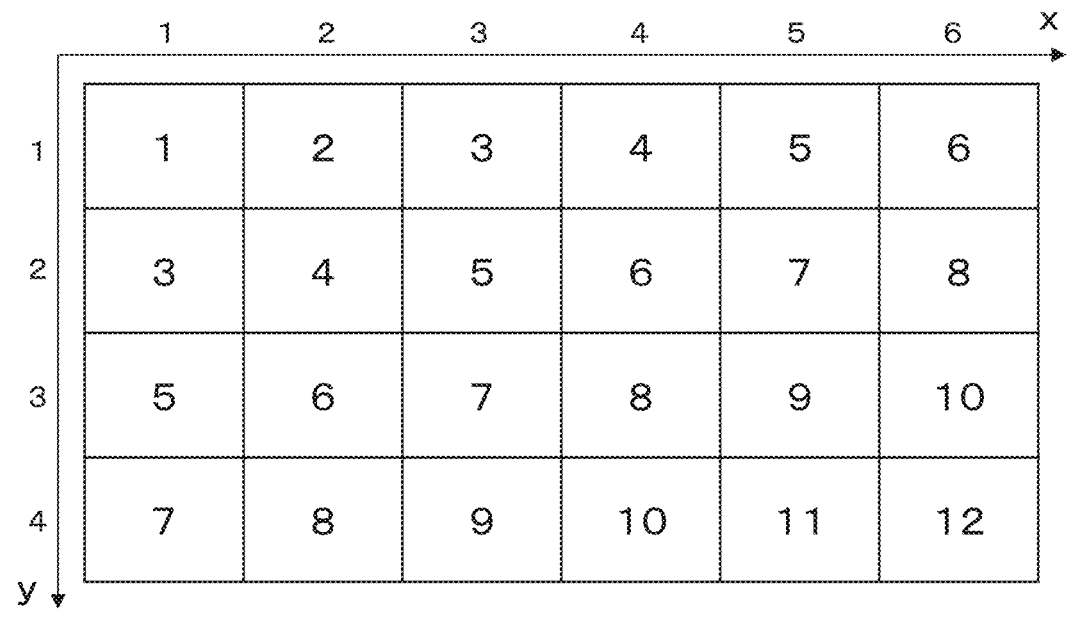

FIG. 18 is a diagram illustrating one example of an order in which the general moving image decoding device 40 using the technique described in PTL 1, for example, performs prediction processing with respect to pixel blocks (individual rectangles illustrated in FIG. 18) in parallel, based on a premise that the above-described relationship is guaranteed. Positions of the pixel blocks in FIG. 18 can be expressed by (x, y) coordinate values within a two-dimensional space. A number appended to each of the pixel blocks in FIG. 18 indicates a processing order for each of the pixel blocks. Pixel blocks having a same number are indicated to be processable in parallel.

In the example illustrated in FIG. 18, first, processing is performed with respect to a pixel block (in the present application, hereinafter, referred to as a pixel block (1, 1), and other pixel blocks are also referred to similarly to the above) located on a coordinate value (1, 1), which indicates an upper left side within a frame. Next (secondly), processing is performed with respect to a pixel block (2, 1) located adjacent to the right of the pixel block (1, 1). At a point of time when processing with respect to the pixel block (2, 1) is completed, it becomes possible to perform processing with respect to a pixel block (3, 1) located adjacent to the right of the pixel block (2, 1), and a pixel block (1, 2) having the pixel blocks (1, 1) and (2, 1) as reference adjacent blocks. Thus, processing with respect to the pixel blocks (3, 1) and (1, 2) is performed in parallel as third processing. In the example illustrated in FIG. 18, thereafter, a pixel block (m, n) (where m is any integer of 3 or more, and n is any integer of 1 or more), and a pixel block (m−2, n+1) are processed in parallel similarly to the above. Note that "−" is an operator indicating subtraction, and "+" is an operator indicating addition.

Further, PTL 2 discloses a device for decoding a moving image stream, which is encoded in the unit of a macroblock (pixel block) of n×n pixels (where n is any natural number) to be generated by dividing each image into a matrix shape. The device detects an inter macroblock (inter-prediction block) within a slice by analyzing information indicating the slice, which is included in an input moving image stream, and is constituted of one or more macroblocks. The device includes two or more decoding processing means for performing decoding processing by using a macroblock as a unit. Further, after causing the two or more decoding processing means to perform in parallel decoding processing with respect to the detected inter macroblock within the slice, the device controls the decoding processing means in such a way as to perform decoding processing with respect to an intra macroblock (intra-prediction block) within the slice.

CITATION LIST

Patent Literature

[PTL 1] Japanese Unexamined Patent Application Publication No. 2006-129284
[PTL 2] Japanese Unexamined Patent Application Publication No. 2009-038501

Non Patent Literature

[NPL 1] "Overview of Information Source Encoding Unit H.264 MPEG-4 AVC Standard", [Online], [searched on Mar. 29, 2017], Internet <URL: http://www.soumu.go.jp/main_sosiki/joho_tsusin/policyreports/joho_tsusin/bunkakai/pdf/060720_3_1-2_sa2.pdf>

SUMMARY OF INVENTION

Technical Problem

In the above-described general moving image decoding processing or moving image encoding processing, for example, as exemplified in FIG. 18, a pixel block (intra-prediction block) as a processing target is searched in an order from a predetermined position (e.g. an upper left side) within a frame. Further, when all processing with respect to reference adjacent blocks (e.g., pixel blocks located on a left side, an upper left side, an upper side, and an upper right side of the intra-prediction block) relating to the searched intra-prediction block is completed, processing with respect to the intra-prediction block is started.

When processing as described above is performed, for example, a case is assumed in which all reference adjacent blocks relating to a certain intra-prediction block are inter-prediction blocks. As described above, since processing with respect to inter-prediction blocks can be performed in parallel, with no relation to (without depending on) a processing condition of the inter-prediction blocks, processing can be completed in a short time by being performed in highly parallel. Further, when the intra-prediction block is located near a lower right side within a frame, for example, the intra-prediction block becomes a search target at a time close to the final in the search order. In this case, despite that the intra-prediction block is processable at an early timing, a timing when processing is actually started becomes late. Specifically, in general moving image decoding processing or moving image encoding processing, since there is a case that start of processing with respect to an intra-prediction block for which processing is executable at an early timing becomes late, accelerating of processing may not be sufficient. PTLs 1 and 2 do not specifically mention this problem. A main object of the invention of the present application is to provide a moving image processing device and the like for solving a problem as described above.

Solution to Problem

A moving image processing device according to one aspect of the invention of the present application includes: a storage means for storing, by dividing an image into a plurality of pixel blocks and performing image processing with respect to the individual pixel blocks, an execution state of the image processing for each of the pixel blocks, when encoding processing or decoding processing with respect to the image is performed; a determination means for determining whether the image processing with respect to a first of the pixel blocks is executable, based on the execution state, stored in the storage means, of the image processing with respect to a second of the pixel blocks for which the image processing with respect to the first pixel block has a dependence regarding a processing order; and an execution means for performing, in parallel or pseudo-parallel, the image processing with respect to a plurality of the first pixel blocks for which the image processing is determined to be executable by the determination means, and updating the execution state, stored in the storage means, of the image processing with respect to the first pixel block.

As another viewpoint for achieving the above-described object, a moving image processing method according to one aspect of the invention of the present application includes: by an information processing device, storing, in a storage means, by dividing an image into a plurality of pixel blocks and performing image processing with respect to the individual pixel blocks, an execution state of the image processing for each of the pixel blocks, when encoding processing or decoding processing with respect to the image is performed; determining whether the image processing with respect to a first of the pixel blocks is executable, based on the execution state, stored in the storage means, of the image processing with respect to a second of the pixel blocks for which the image processing with respect to the first pixel block has a dependence regarding a processing order; and performing, in parallel or pseudo-parallel, image processing with respect to a plurality of the first pixel blocks for which the image processing is determined to be executable, and updating the execution state, stored in the storage means, of the image processing with respect to the first pixel block.

Further, as a further viewpoint for achieving the above-described object, a moving image processing program according to one aspect of the invention of the present application is a program for causing a computer to execute: storage control processing of storing, in a storage means, by dividing an image into a plurality of pixel blocks and performing image processing with respect to the individual pixel blocks, an execution state of the image processing for each of the pixel blocks, when encoding processing or decoding processing with respect to the image is performed; determination processing of determining whether the image processing with respect to a first of the pixel blocks is executable, based on the execution state, stored in the storage means, of the image processing with respect to a second of the pixel blocks for which the image processing with respect to the first pixel block has a dependence regarding a processing order; and execution processing of performing, in parallel or pseudo-parallel, the image processing with respect to a plurality of the first pixel blocks for which the image processing is determined to be executable by the determination processing, and updating the execution state, stored in the storage means, of the image processing with respect to the first pixel block.

Further, the invention of the present application is also achievable by a computer-readable and non-volatile recording medium storing the moving image processing program (computer program).

Advantageous Effects of Invention

The invention of the present application is able to accelerate encoding processing or decoding processing with respect to a moving image.

BRIEF DESCRIPTION OF DRAWINGS

FIG. 18 is a diagram illustrating one example of an order in which the general moving image decoding device 40 performs prediction processing with respect to pixel blocks in parallel.

EXAMPLE EMBODIMENT

In the following, example embodiments according to the invention of the present application are described in detail with reference to the drawings.

First Example Embodiment

Figure 1:
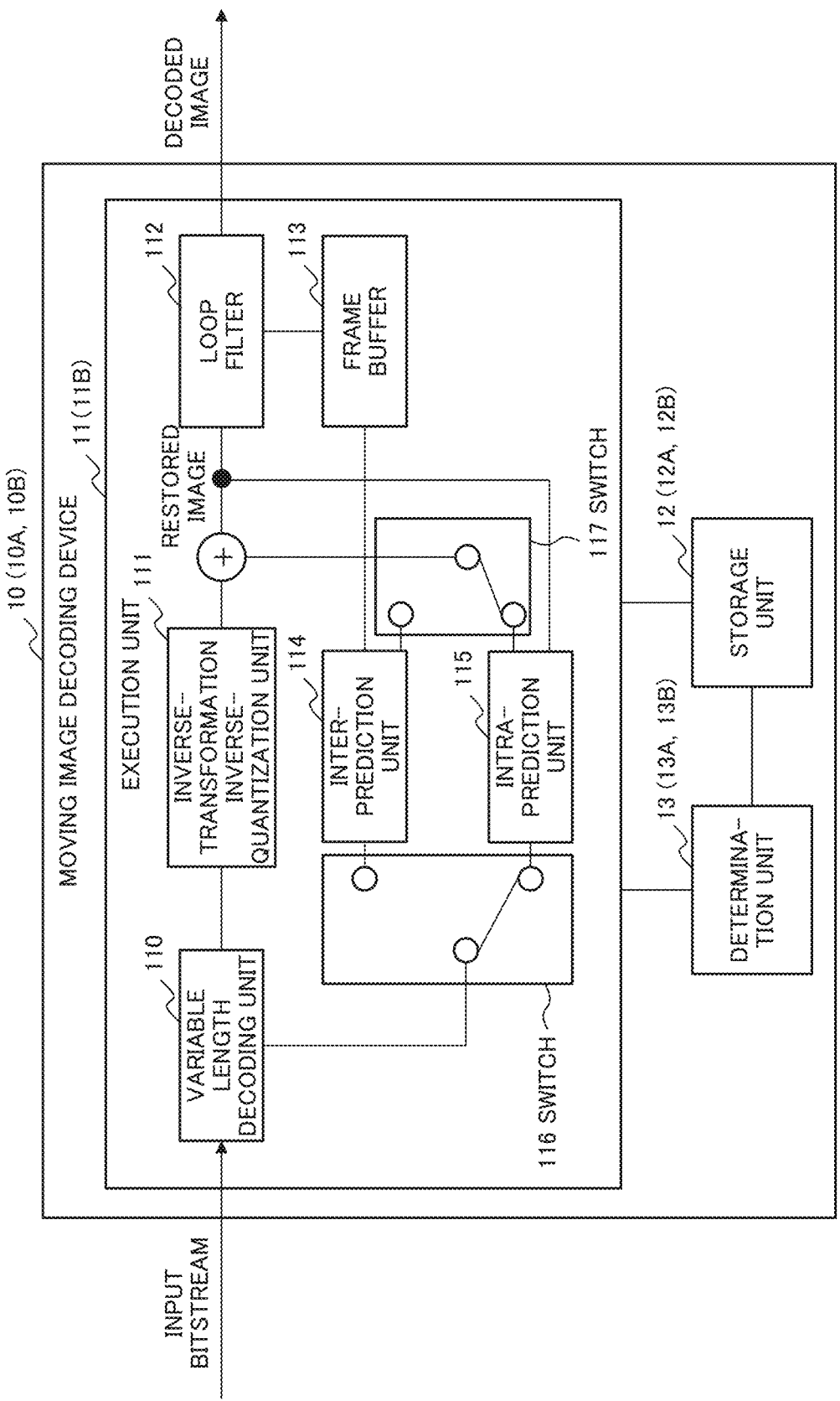
FIG. 1 is a block diagram illustrating a configuration of a moving image decoding device 10 according to a first example embodiment of the invention of the present application.

FIG. 1 is a block diagram conceptually illustrating a configuration of a moving image decoding device 10 according to a first example embodiment of the invention of the present application. Note that it is assumed that FIG. 1 is also referred to in description relating to a moving image decoding device 10A according to a second example embodiment, and a moving image decoding device 10B according to a third example embodiment to be described later.

The moving image decoding device 10 according to the present example embodiment is a device for performing decoding processing conforming to a standard specification such as H.264 or H.265, for example, with respect to an input bitstream indicating a moving image encoded by an unillustrated moving image encoding device, and outputting a decoded image as a result of the decoding processing. The moving image decoding device 10 performs decoding processing, in parallel or pseudo-parallel, for each of pixel blocks (e.g. 16×16 pixel blocks, 4×4 pixel blocks, or the like), which is included in a frame constituting a moving image. However, pseudo-parallel means parallel processing by time division or the like, for example. In the present application, hereinafter, it is assumed that a term including "pseudo-parallel" is referred to as "parallel".

An input bitstream for which the moving image decoding device 10 performs decoding processing is information which has undergone compression by encoding only information indicating a difference between a prediction image generated, based on timewise or spatial correlation, and an input image (original image). Further, a prediction image relating to individual pixel blocks included in the input bitstream is generated by inter-prediction (method) or intra-prediction (method). The inter-prediction is a method for generating a prediction image by using a pixel included in a nearby frame, based on timewise correlation. The intra-prediction is a method for generating a prediction image by using a nearby pixel included in a same frame, based on spatial correlation.

The moving image decoding device 10 according to the present example embodiment mainly includes an execution unit 11, a storage unit 12, and a determination unit 13.

The storage unit 12 is a storage device such as an electronic memory or a magnetic disk. The storage unit 12 stores, for each of pixel blocks, execution states of inter-prediction processing (image processing) by an inter-prediction unit 114, and intra-prediction processing (image processing) by an intra-prediction unit 115 to be described later. The execution states are updated by the inter-prediction unit 114 or the intra-prediction unit 115. The storage unit 12 further stores an encoding type (information) output by a variable length decoding unit 110 to be described later, in association with a pixel block. The encoding type will be described later.

When a certain unprocessed pixel block (first pixel block) is selected as an intra-prediction processing target, the determination unit 13 determines whether intra-prediction processing with respect to the pixel block is executable. More specifically, the determination unit 13 sets, as reference adjacent blocks in an order, pixel blocks (second pixel blocks) located on a left side, an upper left side, an upper side, and an upper right side of the pixel block, for example, and confirms execution states thereof by referring to the storage unit 12. Note that pixel blocks to be set as reference adjacent blocks by the determination unit 13 may be pixel blocks located on positions other than the left side, the upper left side, the upper side, and the upper right side of the pixel block. When prediction processing with respect to all the reference adjacent blocks is completed (specifically, a dependence, regarding a processing order, of a selected pixel block with respect to reference adjacent blocks is cancelled), the determination unit 13 determines that intra-prediction processing by the intra-prediction unit 115 is executable, and notifies the intra-prediction unit 115 of the determination result.

The execution unit 11 includes the variable length decoding unit 110, an inverse-transformation inverse-quantization unit 111, a loop filter 112, a frame buffer 113, the inter-prediction unit 114, the intra-prediction unit 115, and switches 116 and 117.

The variable length decoding unit 110 outputs information including a post quantization transformation coefficient and an encoding type by preforming decoding processing with respect to an input bitstream. Regarding the post quantization transformation coefficient, since a well-known technique can be used within the technical scope of the invention of the present application, detailed description thereof is omitted. The encoding type is information for discriminating whether a pixel block is encoded by inter-prediction or encoded by intra-prediction for each of pixel blocks. The variable length decoding unit 110 stores the encoding type in the storage unit 12 in association with a pixel block.

After inverse quantization of the post quantization transformation coefficient output from the variable length decoding unit 110, the inverse-transformation inverse-quantization unit 111 outputs a difference signal by inverse transformation. Since a well-known technique can be used for processing to be performed by the inverse-transformation inverse-quantization unit 111 within the technical scope of the invention of the present application, detailed description thereof is omitted.

The inter-prediction unit 114 refers to an encoding type and an execution state of prediction processing relating to each of pixel blocks, which are stored in the storage unit 12. The inter-prediction unit 114 selects, from among pixel blocks (inter-prediction blocks) for which encoding types indicate "inter-prediction", an inter-prediction block for which prediction processing is not performed, and performs inter-prediction processing with respect to the selected inter-prediction block. More specifically, the inter-prediction unit 114 generates a prediction image indicating a result of inter-prediction processing by referring to a decoded frame (image) being stored in the frame buffer 113 to be described later. The execution unit 11 generates a restored image by adding the generated prediction image, and the difference signal being output from the inverse-transformation inverse-quantization unit 111. The inter-prediction unit 114 updates an execution state, to "completed", stored in the storage unit 12, regarding the inter-prediction block, for which prediction processing is completed.

The intra-prediction unit 115 refers to an encoding type and an execution state of prediction processing relating to each of pixel blocks, which are stored in the storage unit 12. The intra-prediction unit 115 selects, from among pixel blocks (intra-prediction blocks) for which encoding types indicate "intra-prediction", an intra-prediction block for which prediction processing is not performed.

When being notified from the determination unit 13 that intra-prediction processing with respect to the selected intra-prediction block is executable, the intra-prediction unit 115 starts intra-prediction processing with respect to the intra-prediction block. More specifically, the intra-prediction unit 115 generates a prediction image indicating a result of performing intra-prediction processing by referring to a restored image relating to an adjacent reference block. However, it is assumed that the restored image relating to the adjacent reference block is stored in the storage unit 12, for example, by the intra-prediction unit 115. The execution unit 11 generates the restored image by adding the generated prediction image, and the difference signal being output from the inverse-transformation inverse-quantization unit 111. The intra-prediction unit 115 updates an execution state, to "completed", stored in the storage unit 12, regarding the intra-prediction block, for which prediction processing is completed.

It is assumed that the execution unit 11 is able to switch, as necessary, between the above-described inter-prediction processing and intra-prediction processing, by switching the switches 116 and 117 for switching an input and an output relating to the inter-prediction unit 114 and the intra-prediction unit 115 depending on an encoding type of a pixel block as a processing target. Since a well-known technique can be used for the switching within the technical scope of the invention of the present application, detailed description thereof is omitted. The loop filter 112 generates a decoded image in which a block distortion is removed from the restored image generated by the execution unit 11, and outputs the generated decoded image to the outside. The loop filter 112 stores the generated decoded image in the frame buffer 113.

Next, an operation (processing) of the moving image decoding device 10 according to the present example embodiment is described in detail with reference to the flowcharts of FIGS. 2 to 4.

Figure 2:
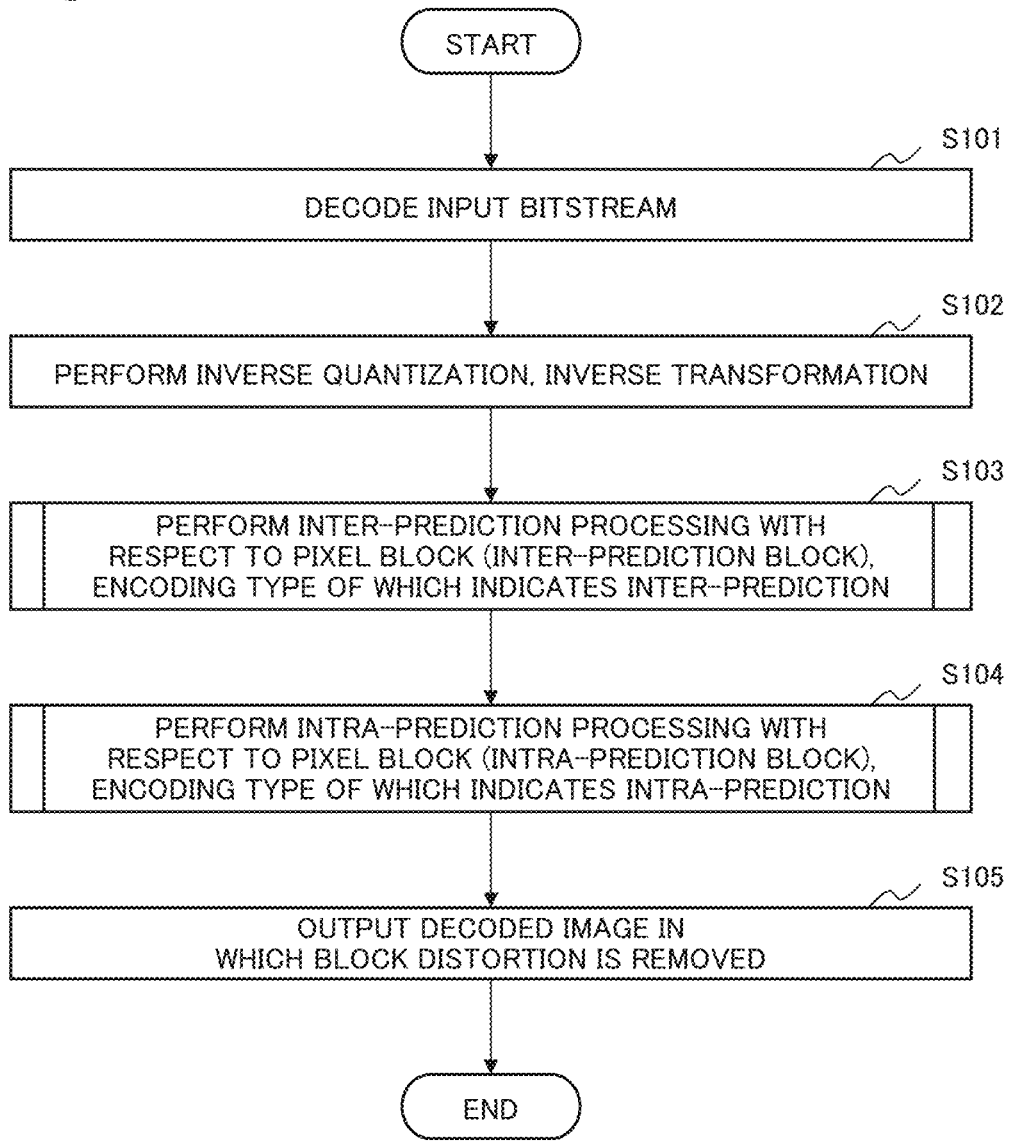
FIG. 2 is a flowchart illustrating an overall operation of the moving image decoding device 10 according to the first example embodiment of the invention of the present application.

FIG. 2 is a flowchart illustrating an overall operation of the moving image decoding device 10.

The variable length decoding unit 110 in the execution unit 11 outputs information including a post quantization transformation coefficient and an encoding type by performing decoding processing with respect to an input bitstream (Step S101). After inverse quantization of the post quantization transformation coefficient output from the variable length decoding unit 110, the inverse-transformation inverse-quantization unit 111 in the execution unit 11 outputs a difference signal by inverse transformation (Step S102).

The execution unit 11 generates a restored image by performing inter-prediction processing with respect to a pixel block (inter-prediction block), an encoding type of which indicates inter-prediction (Step S103). The execution unit 11 generates a restored image by performing intra-prediction processing with respect to a pixel block (intra-prediction block), an encoding type of which indicates intra-prediction (Step S104). The loop filter 112 in the execution unit 11 generates a decoded image in which a block distortion is removed from the generated restored image, outputs the generated decoded image to the outside, and stores the generated decoded image in the frame buffer 113 (Step S105). Thus, the overall processing is ended.

Figure 3:
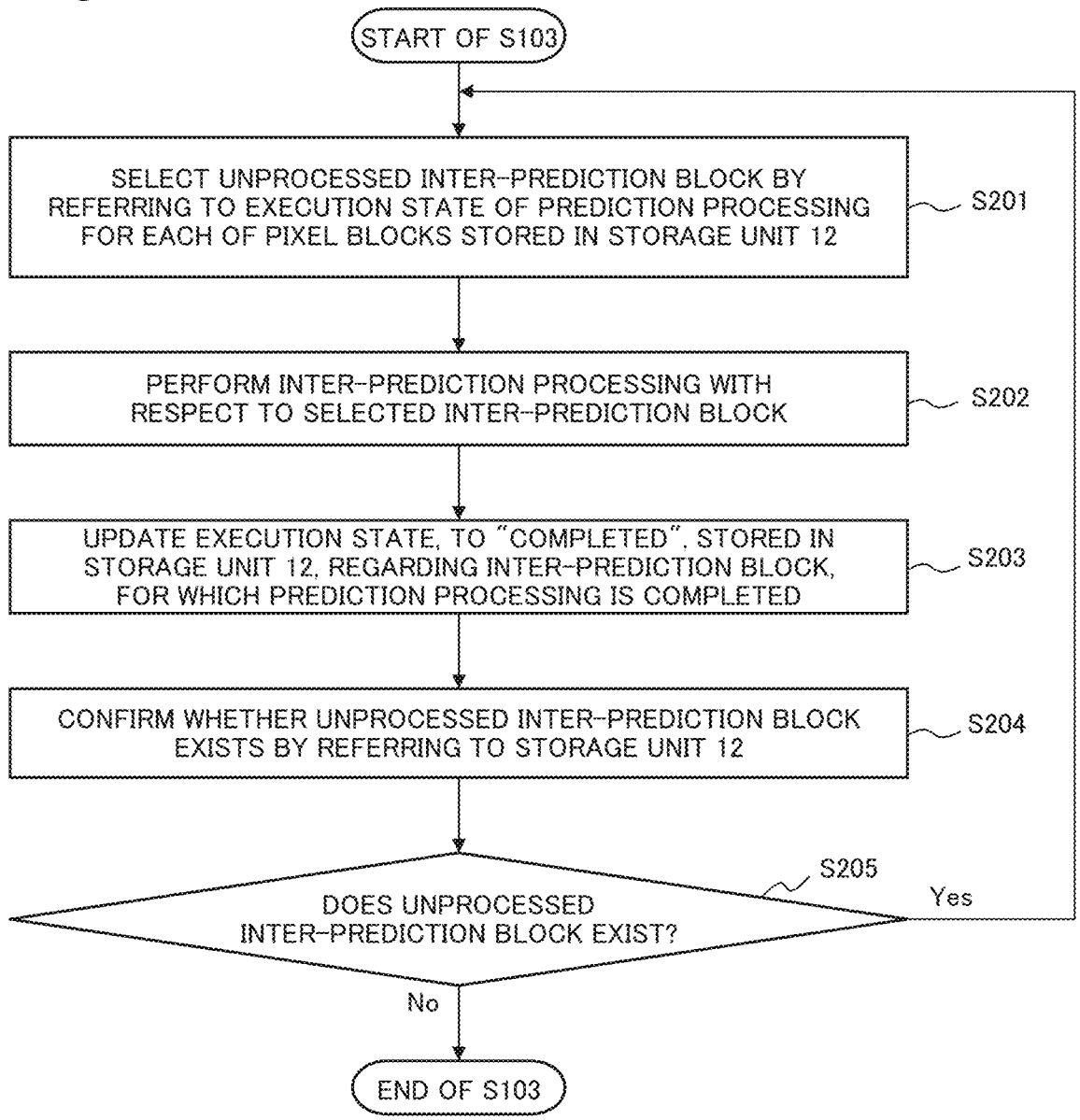
FIG. 3 is a flowchart illustrating details of an operation of performing prediction processing using an inter-prediction method with respect to a pixel block by the moving image decoding device 10 according to the first example embodiment of the invention of the present application.

FIG. 3 is a flowchart illustrating details of an operation of performing prediction processing using an inter-prediction method with respect to a pixel block by the moving image decoding device 10. Specifically, FIG. 3 is a flowchart illustrating details of Step S103 in the flowchart illustrated in FIG. 2.

The inter-prediction unit 114 in the execution unit 11 selects an unprocessed inter-prediction block by referring to an execution state of prediction processing for each of pixel blocks, which is stored in the storage unit 12 (Step S201). The inter-prediction unit 114 performs inter-prediction processing with respect to the selected inter-prediction block (Step S202).

The inter-prediction unit 114 updates an execution state, to "completed", stored in the storage unit 12, regarding the inter-prediction block, for which prediction processing is completed (Step S203). The inter-prediction unit 114 confirms whether an unprocessed inter-prediction block exists by referring to the storage unit 12 (Step S204).

When an unprocessed inter-prediction block exists (Yes in Step S205), the processing returns to Step S201. When an unprocessed inter-prediction block does not exist (No in Step S205), the processing of Step S103 is ended.

Figure 4:
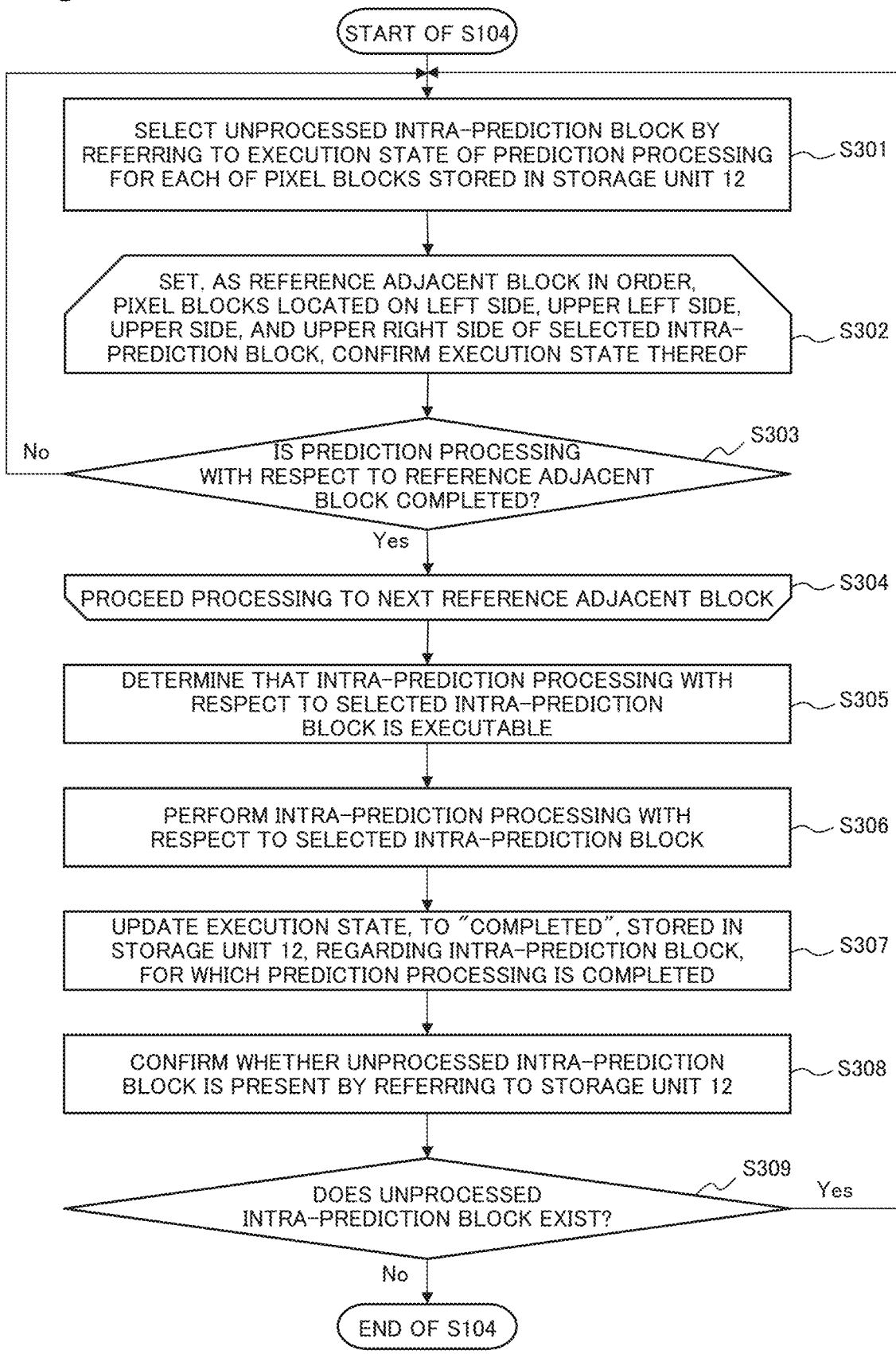
FIG. 4 is a flowchart illustrating details of an operation of performing prediction processing using an intra-prediction method with respect to a pixel block by the moving image decoding device 10 according to the first example embodiment of the invention of the present application.

FIG. 4 is a flowchart illustrating details of an operation of performing prediction processing using an intra-prediction method with respect to a pixel block by the moving image decoding device 10. Specifically, FIG. 4 is a flowchart illustrating details of Step S104 in the flowchart illustrated in FIG. 2.

The intra-prediction unit 115 in the execution unit 11 selects an unprocessed intra-prediction block by referring to an execution state of prediction processing for each of pixel blocks, which is stored in the storage unit 12 (Step S301). The determination unit 13 sets, as a reference adjacent block in an order, pixel blocks located on a left side, an upper left side, an upper side, and an upper right side of the intra-prediction block selected by the intra-prediction unit 115, and confirms, by referring to the storage unit 12, whether prediction processing with respect to the reference adjacent block is completed (Step S302).

When prediction processing with respect to the reference adjacent block is not completed (No in Step S303), the processing returns to Step S301. When prediction processing with respect to the reference adjacent block is completed (Yes in Step S303), the determination unit 13 performs loop processing from Step S302 regarding a next reference adjacent block, and when processing with respect to all the reference adjacent blocks is completed, the processing proceeds to Step S305 (Step S304).

The determination unit 13 determines that intra-prediction processing with respect to the intra-prediction block selected by the intra-prediction unit 115 is executable, and notifies the intra-prediction unit 115 of the determination result (Step S306). The intra-prediction unit 115 performs intra-prediction processing with respect to the selected intra-prediction block (Step S306).

The intra-prediction unit 115 updates an execution state, to "completed", stored in the storage unit 12, regarding the intra-prediction block, for which prediction processing is completed (Step S307). The intra-prediction unit 115 confirms whether an unprocessed intra-prediction block exists by referring to the storage unit 12 (Step S308).

When an unprocessed intra-prediction block exists (Yes in Step S309), the processing returns to Step S301. When an unprocessed intra-prediction block does not exist (No in Step S309), the processing of Step S104 is ended.

The moving image decoding device 10 according to the present example embodiment is able to accelerate decoding processing with respect to a moving image. A reason for this is that, when a first pixel block has a dependence with respect to a second pixel block regarding a processing order in relation to prediction processing, it is possible to detect that the dependence is cancelled at an early timing by managing an execution state of prediction processing (image processing) for each of pixel blocks, and as a result of the detection, accelerate start of prediction processing with respect to the first pixel block.

In the following, an advantageous effect to be achieved by the moving image decoding device 10 according to the present example embodiment is described in detail.

In general moving image decoding processing (similarly in moving image encoding processing), an intra-prediction block as a processing target is searched in an order from an upper left side within a frame, for example. Further, when processing with respect to all reference adjacent blocks relating to the searched intra-prediction block is completed, processing with respect to the intra-prediction block is started. In a case where processing as described above is performed, for example, when all reference adjacent blocks relating to a certain intra-prediction block are inter-prediction blocks, and are located near a lower right side within a frame, despite that the intra-prediction block is processable at an early timing, a timing when processing is actually started for the intra-prediction block becomes late. Specifically, in general moving image decoding processing or moving image encoding processing, since there is a case in which start of processing with respect to an intra-prediction block for which processing is executable at an early timing becomes late, there is a problem that accelerating of processing is not sufficient.

In order to solve a problem as described above, the moving image decoding device 10 according to the present example embodiment includes the execution unit 11, the storage unit 12, and the determination unit 13, and is operated as described above with reference to FIGS. 2 to 4, for example. Specifically, the storage unit 12 stores, by dividing an image into a plurality of pixel blocks and performing image processing with respect to the individual pixel blocks, an execution state of the image processing for each of the pixel blocks, when decoding processing with respect to the image is performed. The determination unit 13 determines whether image processing with respect to a first pixel block is executable, based on an execution state, stored in the storage unit 12, of image processing with respect to a second pixel block for which image processing with respect to the first pixel block has a dependence regarding a processing order. The execution unit 11 performs image processing in parallel with respect to a plurality of the first pixel blocks for which image processing is determined to be executable by the determination unit 13, and updates an execution state, stored in the storage unit 12, of image processing with respect to the first pixel block.

Figure 5:
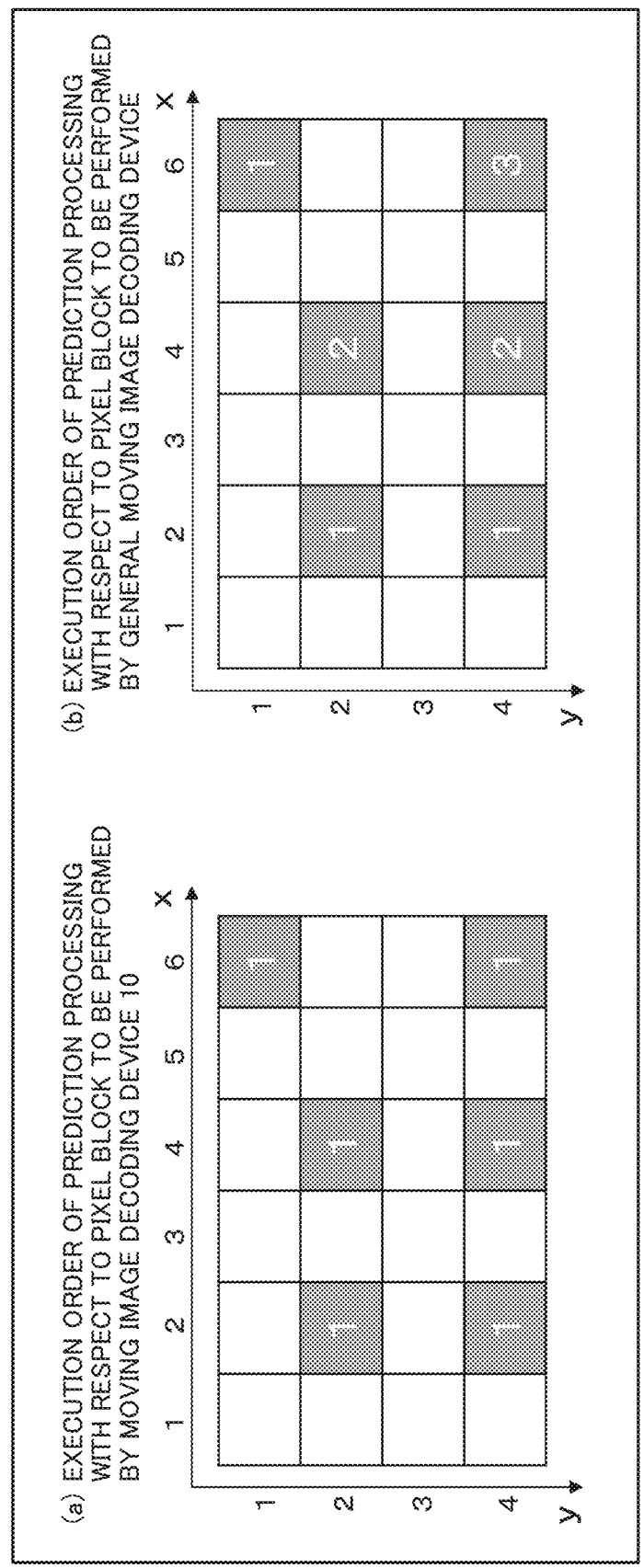
FIG. 5 is a diagram illustrating a comparison example of an order in which the moving image decoding device 10 according to the first example embodiment of the invention of the present application, and a general moving image decoding device perform prediction processing with respect to pixel blocks in parallel.

FIG. 5 is a diagram illustrating a comparison example of an order in which the moving image decoding device 10 according to the present example embodiment, and a general moving image decoding device perform prediction processing (image processing) with respect to pixel blocks in parallel. In FIG. 5, white rectangles indicate inter-prediction blocks, and gray rectangles indicate intra-prediction blocks. In FIG. 5, a number appended to the intra-prediction blocks indicates a processing order for each of the intra-prediction blocks, and intra-prediction blocks having a same number are indicated to be processable in parallel. Further, it is assumed that reference adjacent blocks relating to each of the intra-prediction blocks are pixel blocks located on a left side, an upper left side, an upper side, and an upper right side of the target intra-prediction block.

In the example illustrated in FIG. 5, it is assumed that all reference adjacent blocks relating to each of the intra-prediction blocks are inter-prediction blocks. The moving image decoding device 10 according to the present example embodiment manages an execution state of prediction processing with respect to a reference adjacent block (second pixel block) for each of pixel blocks (first pixel blocks). Therefore, as illustrated in FIG. 5(a), the moving image decoding device 10 can perform prediction processing with respect to six intra-prediction blocks in parallel. Specifically, in this case, a maximum parallel degree of processing is "6", and the number of processing steps is "1".

On the other hand, a general moving image decoding device searches an intra-prediction block as a processing target in an order from an upper left side within a frame. Therefore, a time when a general moving image decoding device can start prediction processing with respect to an intra-prediction block (m, n) is after prediction processing with respect to an intra-prediction block located in a range from a coordinate value (1, n) to a coordinate value (m−1, n) (specifically, on a left side of a column, in which the y-coordinate is the same as that of the intra-prediction block (m, n)) is completed. Therefore, as illustrated in FIG. 5(b), a general moving image decoding device performs prediction processing with respect to the six intra-prediction blocks in an order in parallel. Specifically, in this case, a maximum parallel degree of processing is "3", and the number of processing steps is "3".

As described above, as compared with a general moving image decoding device, the moving image decoding device 10 according to the present example embodiment reduces the number of steps of prediction processing by increasing a parallel degree of prediction processing with respect to pixel blocks. Therefore, it is possible to accelerate decoding processing with respect to a moving image. In recent years, a device such as a graphics processing unit (GPU) capable of performing a large number of processing in parallel is achieved by providing a large number of arithmetic units. The moving image decoding device 10 according to the present example embodiment can accelerate decoding processing with respect to a moving image by effectively utilizing a function included in a device as described above.

Second Example Embodiment

A configuration of a moving image decoding device 10A according to a second example embodiment of the invention of the present application is described with reference to FIG. 1. In the present example embodiment, components having similar functions as those in the above-described first example embodiment are indicated with same reference numbers as those in the first example embodiment, and detailed description thereof is omitted.

The moving image decoding device 10A according to the present example embodiment is different from the moving image decoding device 10 according to the first example embodiment, in a point that the moving image decoding device 10A refers to an intra-prediction mode set for each of intra-prediction blocks, when prediction processing with respect to an intra-prediction block is performed. Reference adjacent blocks according to the first example embodiment are fixed at pixel blocks located on a left side, an upper left side, an upper side, and an upper right side of an intra-prediction block, for example. Specifically, in the first example embodiment, a positional relationship between an intra-prediction block and a reference adjacent block thereof is common among intra-prediction blocks. On the other hand, in the present example embodiment, a positional relationship between an intra-prediction block and a reference adjacent block thereof may differ for each of intra-prediction blocks. The intra-prediction mode is information capable of deciding a reference adjacent block relating to a certain intra-prediction block.

Figure 6:
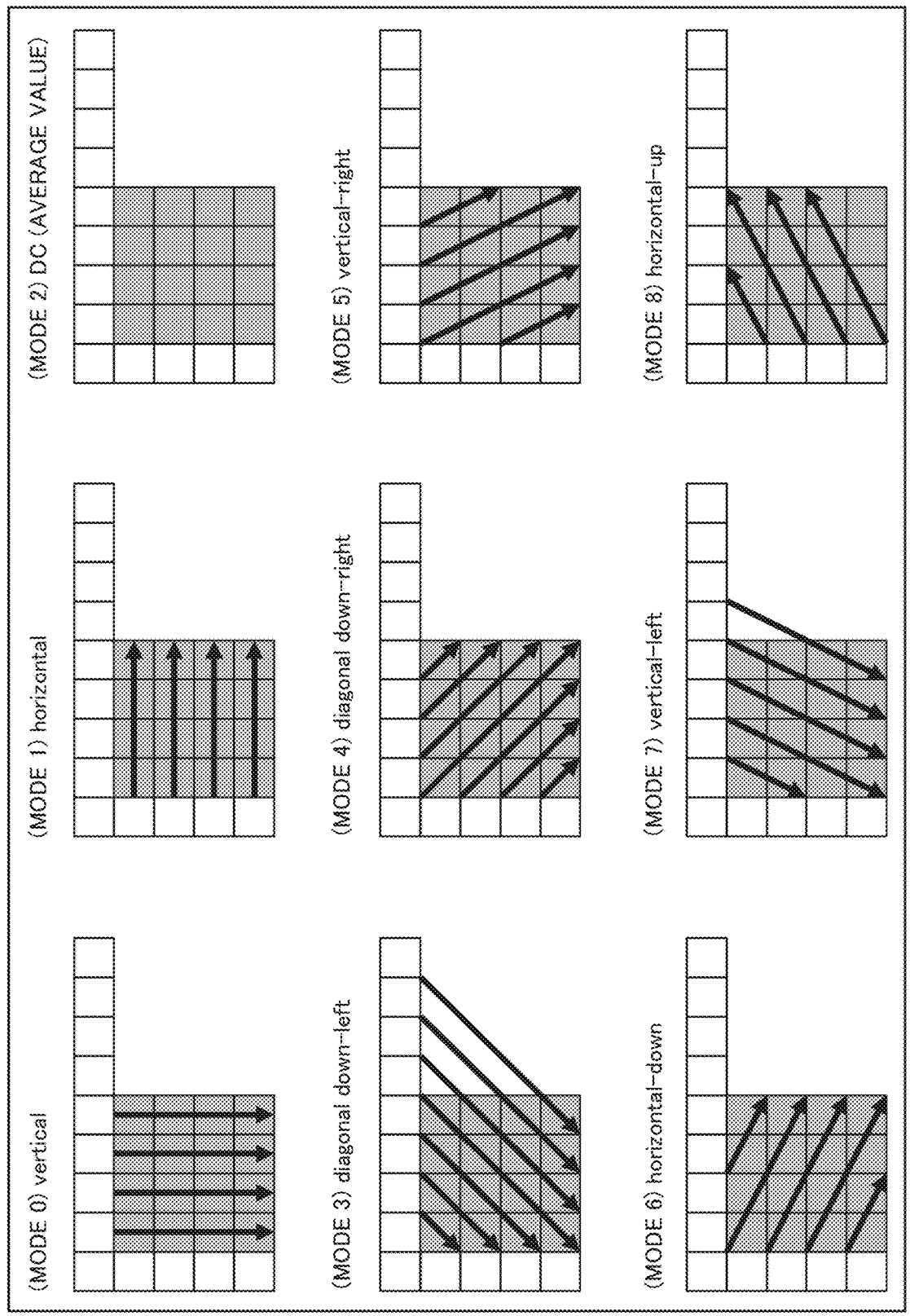
FIG. 6 is a diagram exemplifying a content of each of intra-prediction modes to be referred by a moving image decoding device 10A according to a second example embodiment of the invention of the present application.

FIG. 6 is a diagram exemplifying a content of an intra-prediction mode to be referred to by the moving image decoding device 10A according to the present example embodiment. The content illustrated in FIG. 6 is described in NPL 1. In the example illustrated in FIG. 6, for example, a mode 0 indicates that a pixel block located on an upper side of an intra-prediction block is a reference adjacent block. Likewise, for example, a mode 1 indicates that a pixel block located on a left side of the intra-prediction block is a reference adjacent block. Specifically, in prediction processing, an intra-prediction block for which the intra-prediction mode is set to "0" has a dependence with respect to a pixel block located on an upper side, and an intra-prediction block for which the intra-prediction mode is set to "1" has a dependence with respect to a pixel block located on a left side.

As illustrated in FIG. 1, the moving image decoding device 10A according to the present example embodiment includes an execution unit 11, a storage unit 12A, and a determination unit 13A.

The storage unit 12A stores a value indicating an intra-prediction mode for each of pixel blocks.

The determination unit 13A sets, as a reference adjacent block in an order, a pixel block located at a position to be decided by an intra-prediction mode stored in the storage unit 12A with respect to an intra-prediction block selected as a processing target by an intra-prediction unit 115. Further, the determination unit 13A confirms an execution state of prediction processing with respect to the reference adjacent blocks by referring to the storage unit 12. When prediction processing with respect to all the reference adjacent blocks is completed, the determination unit 13A determines that intra-prediction processing by the intra-prediction unit 115 is executable, and notifies the intra-prediction unit 115 of the determination result.

An operation of the moving image decoding device 10A according to the present example embodiment is as illustrated in the flowchart of FIG. 2, and details of Step S104 in the flowchart illustrated in FIG. 2 are different from those in the moving image decoding device 10 according to the first example embodiment.

Figure 7:
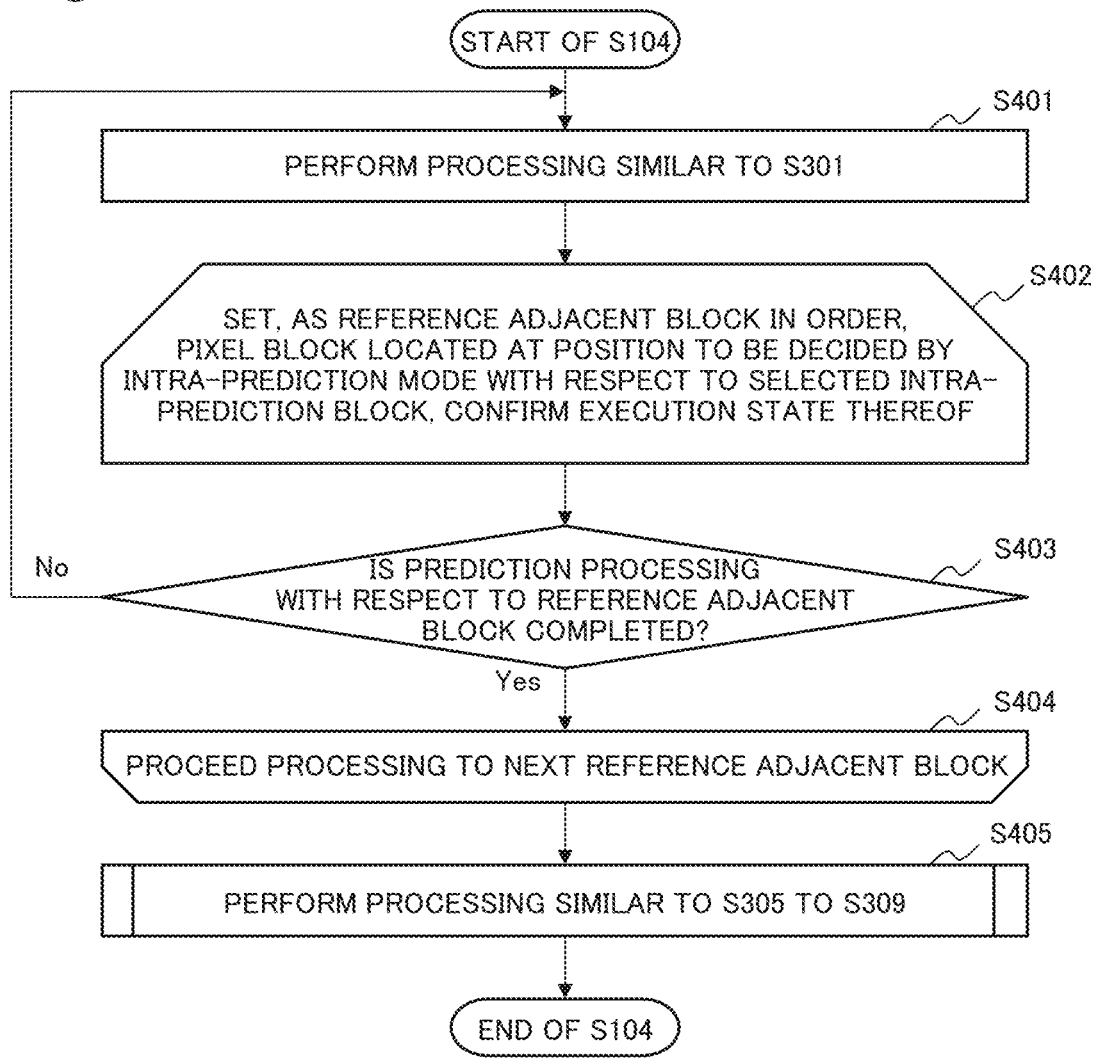
FIG. 7 is a flowchart illustrating details of an operation of performing prediction processing using an intra-prediction method with respect to a pixel block by the moving image decoding device 10A according to the second example embodiment of the invention of the present application.

FIG. 7 is a flowchart illustrating details of an operation of performing processing of Step S104, specifically, prediction processing using an intra-prediction method with respect to a pixel block by the moving image decoding device 10A according to the present example embodiment.

The intra-prediction unit 115 in the execution unit 11 performs processing similar to Step S301 illustrated in FIG. 4 (Step S401). The determination unit 13A sets, as a reference adjacent block in an order, a pixel block located at a position to be decided by an intra-prediction mode with respect to an intra-prediction block selected by the intra-prediction unit 115, and confirms an execution state of prediction processing with respect to the reference adjacent block (Step S402).

When prediction processing with respect to the reference adjacent block is not completed (No in Step S403), the processing returns to Step S401. When prediction processing with respect to the reference adjacent block is completed (Yes in Step S403), the determination unit 13A performs loop processing from Step S402 regarding a next reference adjacent block, and when processing with respect to all the reference adjacent blocks is completed, the processing proceeds to Step S405 (Step S404). The moving image decoding device 10A performs processing similar to Steps S305 to S309 illustrated in FIG. 4 (Step S405), and the processing of Step S104 is ended.

The moving image decoding device 10A according to the present example embodiment is able to accelerate decoding processing with respect to a moving image. A reason for this is as described in relation to the first example embodiment.

Further, since the moving image decoding device 10A according to the present example embodiment narrows a target for which it is confirmed whether a dependence is cancelled in prediction processing with respect to an intra-prediction block, to a reference adjacent block to be decided by an intra-prediction mode, it is possible to further accelerate decoding processing with respect to a moving image.

Figure 8:
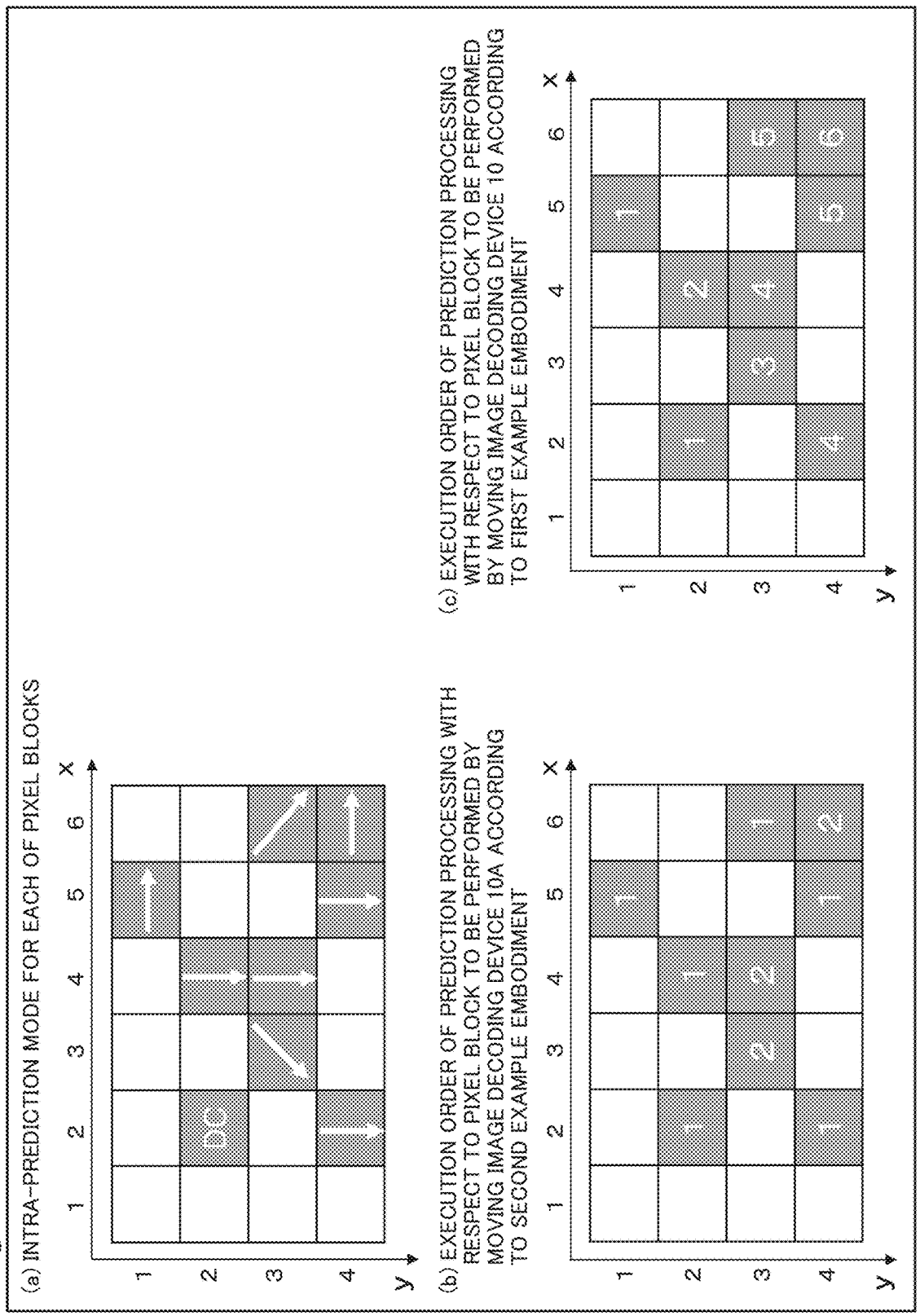
FIG. 8 is a diagram illustrating a comparison example of an order in which the moving image decoding device 10A according to the second example embodiment of the invention of the present application, and a general moving image decoding device perform prediction processing with respect to pixel blocks in parallel.

FIG. 8 is a diagram illustrating a comparison example of an order in which the moving image decoding device 10A according to the present example embodiment, and the moving image decoding device 10 according to the first example embodiment perform prediction processing with respect to pixel blocks in parallel. In FIG. 8, white and gray rectangles, and numbers appended to pixel blocks are as described with reference to FIG. 5.

FIG. 8(a) exemplifies an intra-prediction mode for each of pixel blocks (intra-prediction blocks). In FIG. 8(a), for example, a mode 2 exemplified in FIG. 6 is set for a pixel block (2, 2), as an intra-prediction mode. In FIG. 8(a), for example, the mode 1 exemplified in FIG. 6 is set for a pixel block (5, 1), as an intra-prediction mode.

When an intra-prediction mode for each of pixel blocks is set as exemplified in FIG. 8(a), an execution order of prediction processing with respect to an intra-prediction block to be performed by the moving image decoding device 10A according to the present example embodiment is as exemplified in FIG. 8(b). Specifically, in FIG. 8(b), as exemplified in FIG. 8(a), an intra-prediction block having an execution order "1" indicates that all reference adjacent blocks of the intra-prediction block are inter-prediction blocks. Therefore, the moving image decoding device 10A can perform prediction processing in parallel with respect to the intra-prediction blocks at a first step. In FIG. 8(b), as exemplified in FIG. 8(a), an intra-prediction block having an execution order "2" indicates that a reference adjacent block of the intra-prediction block is an intra-prediction block for which prediction processing is performed at a first step. Specifically, in this case, a maximum parallel degree of processing is "6", and the number of processing steps is "2".

On the other hand, when an intra-prediction mode for each of pixel blocks is set as exemplified in FIG. 8(a), an execution order of prediction processing with respect to an intra-prediction block to be performed by the moving image decoding device 10 according to the first example embodiment is as exemplified in FIG. 8(c). Since the moving image decoding device 10 does not refer to an intra-prediction mode set for each of intra-prediction blocks, prediction processing with respect to a certain intra-prediction block is performed, after prediction processing with respect to reference adjacent blocks thereof (specifically, pixel blocks located on a left side, an upper left side, an upper side, and an upper right side) is completed. Therefore, in this case, a maximum parallel degree of processing is "2", and the number of processing steps is "6".

In this way, the moving image decoding device 10A according to the present example embodiment can further accelerate decoding processing with respect to a moving image, as compared with the moving image decoding device 10 according to the first example embodiment.

Third Example Embodiment

A configuration of a moving image decoding device 10B according to a third example embodiment of the invention of the present application is described with reference to FIG. 1. In the present example embodiment, components having similar functions as those in the above-described first example embodiment are indicated with same reference numbers as those in the first example embodiment, and detailed description thereof is omitted.

The moving image decoding device 10B according to the present example embodiment calculates a value (hereinafter, referred to as a "dependency index") indicating a dependence of a processing order relating to an intra-prediction block, which is acquired by analyzing in advance a dependence regarding prediction processing with respect to an intra-prediction block. Further, the moving image decoding device 10B is different from the moving image decoding device 10 according to the first example embodiment, and the moving image decoding device 10A according to the second example embodiment, in a point that the moving image decoding device 10B controls performing prediction processing in parallel with respect to intra-prediction blocks by using the dependency index. However, the dependency index is information indicating the number of reference adjacent blocks on which an intra-prediction block depends in prediction processing, and the value of the dependency index is updated, accompanied by completion of prediction processing with respect to a certain reference adjacent block. Note that, since prediction processing with respect to an inter-prediction block is performed in highly parallel in a short time, the dependency index according to the present example embodiment may be a value calculated by using only an intra-prediction block as a target.

As illustrated in FIG. 1, the moving image decoding device 10B according to the present example embodiment includes an execution unit 11B, a storage unit 12B, and a determination unit 13B.

The execution unit 11B calculates a dependency index relating to each of intra-prediction blocks, based on information (e.g., an encoding type according to the first example embodiment, an intra-prediction mode according to the second example embodiment, or the like), which is stored in the storage unit 12B and capable of deciding a reference adjacent block for each of intra-prediction blocks, before decoding processing with respect to a moving image is started by the moving image decoding device 10B. The execution unit 11B stores, in the storage unit 12B, the calculated dependency index relating to each of the intra-prediction blocks.

The execution unit 11B updates (counts down), each time when prediction processing with respect to any of intra-prediction blocks is completed, the dependency index relating to an intra-prediction block having the intra-prediction block as a reference adjacent block, to a value decremented by "1".

When a dependency index relating to a certain intra-prediction block indicates that a reference adjacent block for which prediction processing is not completed does not exist (e.g., a dependency index is "0"), the determination unit 13B determines that prediction processing with respect to an intra-prediction block is executable.

Figure 9:
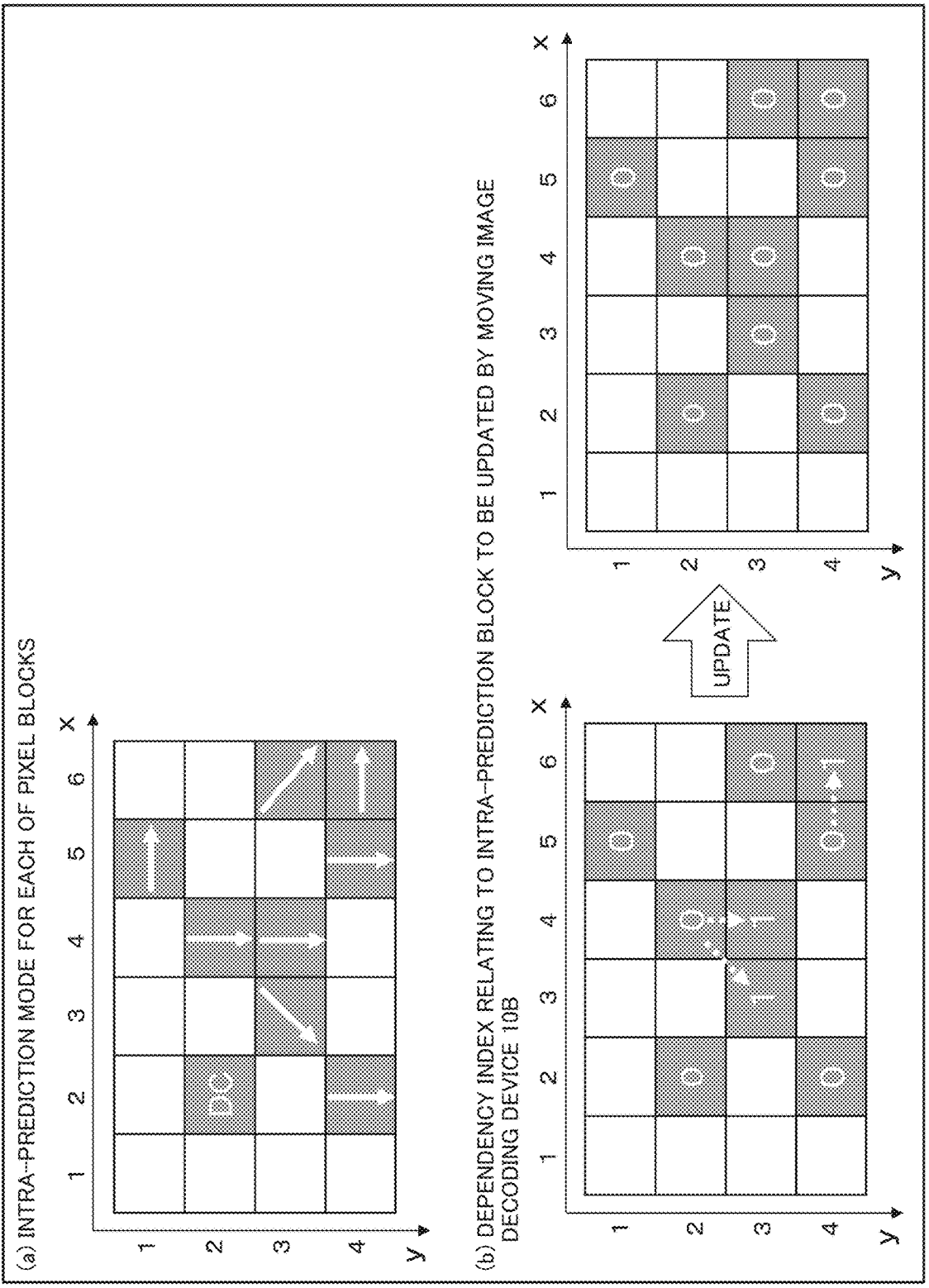
FIG. 9 is a diagram exemplifying a dependency index relating to a pixel block to be updated by a moving image decoding device 10B according to a third example embodiment of the invention of the present application.

FIG. 9 is a diagram exemplifying a dependency index relating to a pixel block (intra-prediction block) to be updated by the moving image decoding device 10B according to the present example embodiment. In FIG. 9, white and gray rectangles are as described with reference to FIG. 5.

FIG. 9(*a*) exemplifies an intra-prediction mode for each of intra-prediction blocks. It is assumed that an intra-prediction mode for each of intra-prediction blocks according to the present example embodiment is equivalent to an intra-prediction mode for each of intra-prediction blocks according to the second example embodiment exemplified in FIG. 8(*a*).

When an intra-prediction mode for each of intra-prediction blocks is set as exemplified in FIG. 9(*a*), a dependency index relating to an intra-prediction block to be updated by the moving image decoding device 10B according to the present example embodiment is as exemplified in FIG. 9(*b*). However, in FIG. 9(*b*), a number appended to an intra-prediction block indicates a dependency index relating to the intra-prediction block.

As exemplified in FIG. 9(*b*), it is assumed that dependency indexes of six intra-prediction blocks among nine intra-prediction blocks included in a frame are initially set to 0, and dependency indexes of three intra-prediction blocks among the nine intra-prediction blocks are initially set to 1. The six intra-prediction blocks, a dependency index of which is initially set to 0 in FIG. 9(*b*), are equivalent to pixel blocks having an execution order of prediction processing being "1" in FIG. 8(*b*). The three intra-prediction blocks, a dependency index of which is initially set to 1 in FIG. 9(*b*), are equivalent to pixel blocks having an execution order of prediction processing being "2" in FIG. 8(*b*).

The moving image decoding device 10B performs prediction processing with respect to the six intra-prediction blocks, a dependency index of which is initially set to 0, in parallel at a first step. After the prediction processing at the first step is completed, the moving image decoding device 10B updates, from "1" to "0", the dependency index relating to the three intra-prediction blocks, which depends on the intra-prediction blocks for which prediction processing has been performed, and a dependency index of which is initially set to 1. Thereafter, the moving image decoding device 10B performs prediction processing with respect to the three intra-prediction blocks in parallel at a second step. Specifically, in this case, a maximum parallel degree of processing is "6", and the number of processing steps is "2".

An operation of the moving image decoding device 10B according to the present example embodiment is as described in the flowchart illustrated in FIG. 2, and details of Step S104 in the flowchart illustrated in FIG. 2 are different from those in the moving image decoding device 10 according to the first example embodiment.

Figure 10:
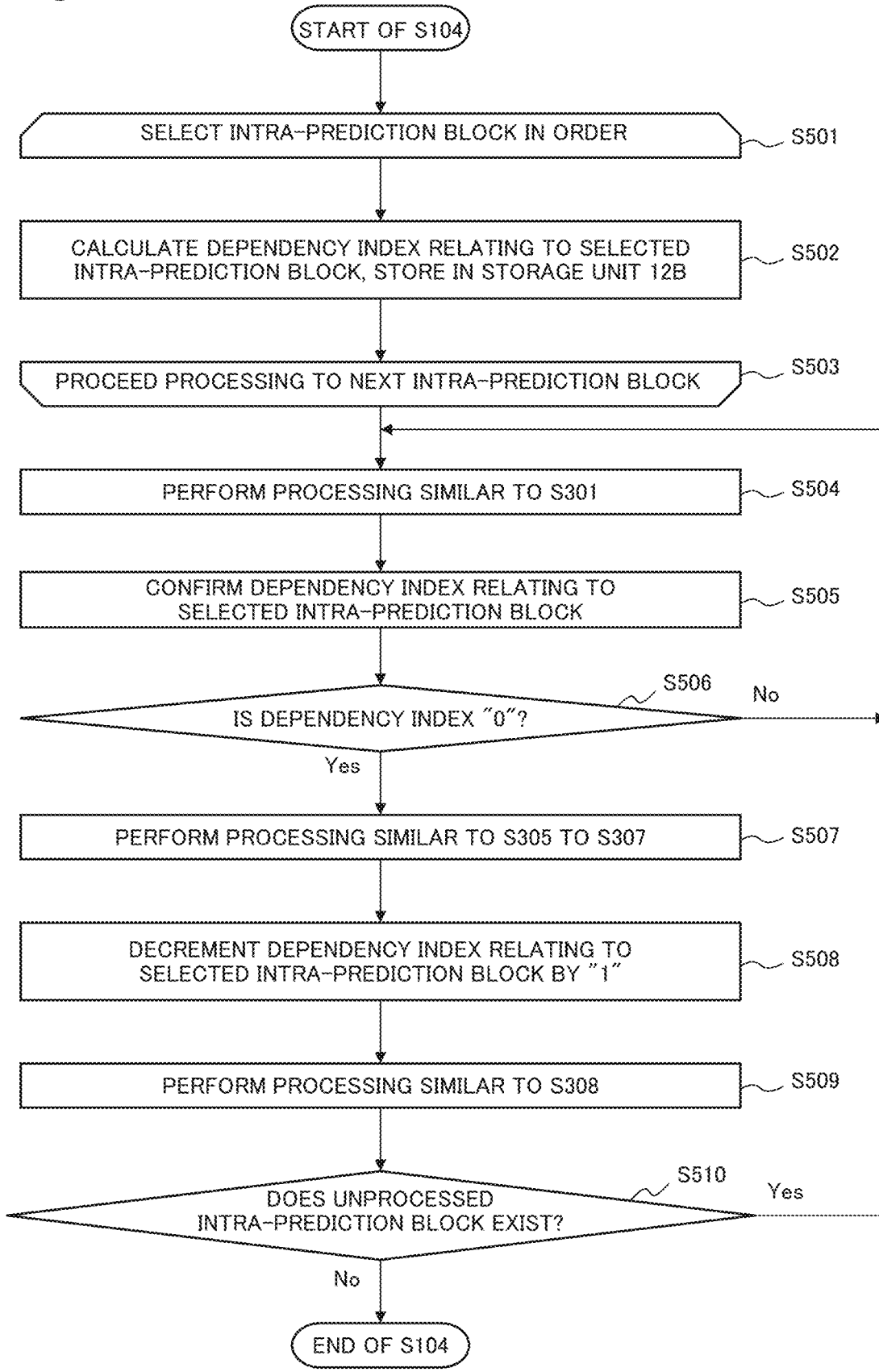
FIG. 10 is a flowchart illustrating details of an operation of performing prediction processing using an intra-prediction method with respect to a pixel block by the moving image decoding device 10B according to the third example embodiment of the invention of the present application.

FIG. 10 is a flowchart illustrating details of an operation of performing processing of Step S104, specifically, prediction processing using an intra-prediction method with respect to a pixel block by the moving image decoding device 10B according to the present example embodiment.

The execution unit 11B selects an intra-prediction block in an order, based on information stored in the storage unit 12B, before decoding processing with respect to a moving image is started by the moving image decoding device 10B (Step S501). The execution unit 11B calculates a dependency index relating to the selected intra-prediction block, based on the information stored in the storage unit 12B, and stores the calculated dependency index in the storage unit 12B (Step S502). The execution unit 11B repeatedly performs loop processing from Steps S501 to S503 until processing with respect to all the intra-prediction blocks is completed (Step S103).

The intra-prediction unit 115 in the execution unit 11B performs processing similar to Step S301 illustrated in FIG. 4 (Step S504). The determination unit 13B confirms a dependency index relating to the intra-prediction block selected by the intra-prediction unit 115, by referring to the storage unit 12B (Step S505). When the dependency index is not "0" (No in Step S506), the processing returns to Step S504. When the dependency index is "0" (Yes in Step S506), the moving image decoding device 10B performs processing similar to Steps S305 to S307 illustrated in FIG. 4 (Step S507).

The execution unit 11B decrements the dependency index relating to the selected intra-prediction block by "1" (Step S508). The intra-prediction unit 115 performs processing similar to Step S308 illustrated in FIG. 4 (Step S509). When an unprocessed intra-prediction block exists (Yes in Step S510), the processing returns to Step S504. When an unprocessed intra-prediction block does not exist (No in Step S510), the processing of Step S104 is ended.

The moving image decoding device 10B according to the present example embodiment can accelerate decoding processing with respect to a moving image. A reason for this is as described in relation to the first example embodiment.

Further, the moving image decoding device 10B according to the present example embodiment is able to determine whether a dependence is cancelled, when prediction processing with respect to an intra-prediction block is performed, by simple processing of confirming whether a dependency index relating to the intra-prediction block is "0", for example. Therefore, it is possible to accelerate decoding processing with respect to a moving image.

Fourth Example Embodiment

Figure 11:
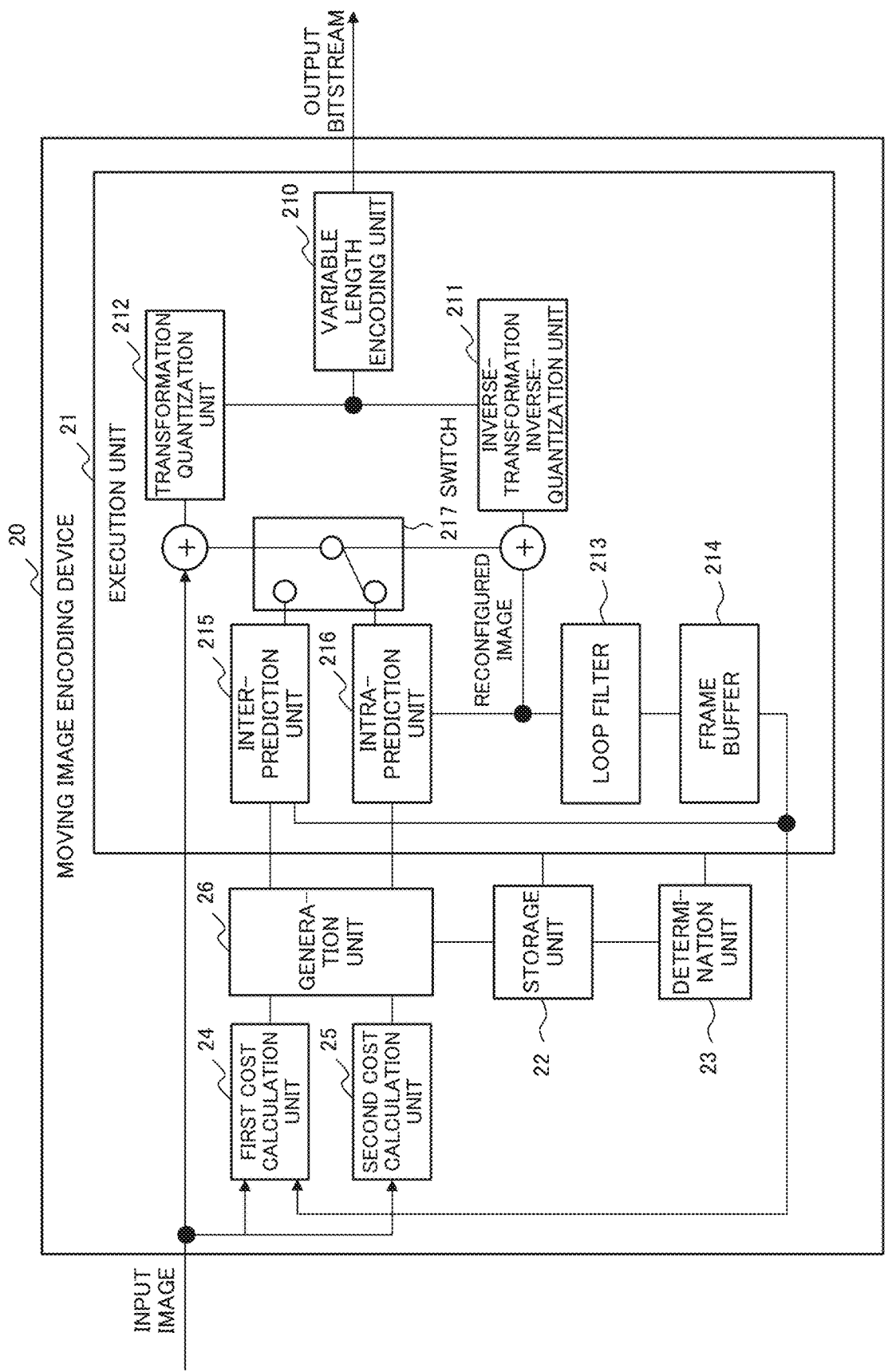
FIG. 11 is a block diagram illustrating a configuration of a moving image encoding device 20 according to a fourth example embodiment of the invention of the present application.

FIG. 11 is a block diagram conceptually illustrating a configuration of a moving image encoding device 20 according to a fourth example embodiment of the invention of the present application. The moving image encoding device 20 according to the present example embodiment is a device for performing encoding processing conforming to H.264, H265, or the like, for example, with respect to an input image, and outputting, to an unillustrated moving image decoding device (e.g. the moving image decoding device 10 according to the first example embodiment, or the like), an output bitstream, as a result of the encoding processing. Further, the moving image encoding device 20 according to the present example embodiment is a device to which a configuration (technique) included in the moving image decoding device 10 according to the first example embodiment is applied.

The moving image encoding device 20 according to the present example embodiment mainly includes an execution unit 21, a storage unit 22, a determination unit 23, a first cost calculation unit 24, a second cost calculation unit 25, and a generation unit 26.

The first cost calculation unit 24 calculates, for each of pixel blocks, an encoding cost when an inter-prediction method is used as prediction processing (image processing) with respect to a pixel block. However, the encoding cost is an index indicating an information processing amount necessary for performing encoding and decoding with respect to an image. It is assumed that the first calculation unit 24 has a calculation criterion for calculating an encoding cost when an inter-prediction method is used. Further, at this occasion, the first cost calculation unit 24 also generates a motion vector (prediction vector) in inter-prediction.

The second cost calculation unit 25 calculates, for each of pixel blocks, an encoding cost when an intra-prediction method is used as prediction processing (image processing) with respect to a pixel block. However, it is assumed that the second cost calculation unit 25 has a calculation criterion for calculating an encoding cost when an intra-prediction method is used.

The generation unit 26 generates encoding type information (specifically, information for discriminating whether encoding is performed by inter-prediction or performed by intra-prediction) for each of pixel blocks, based on the calculation results regarding an encoding cost by the first cost calculation unit 24 and the second cost calculation unit 25. When an encoding cost relating to a certain pixel block is less in inter-prediction, for example, the generation unit 26 sets an encoding type relating to the certain pixel block to inter-prediction, and when an encoding cost is less in intra-prediction, the generation unit 26 sets an encoding type relating to the certain pixel block to intra-prediction. The generation unit 26 stores the generated encoding type information in the storage unit 22.

The storage unit 22 is a storage device such as an electronic memory or a magnetic disk. The storage unit 22 stores, for each of pixel blocks, execution states of inter-prediction processing (image processing) by an inter-prediction unit 215, and intra-prediction processing (image processing) by an intra-prediction unit 216 to be described later. The execution states are updated by the inter-prediction unit 215 or the intra-prediction unit 216. The storage unit 22 further stores encoding type information input by the generation unit.

When a certain unprocessed pixel block (first pixel block) is selected as an intra-prediction processing target, the determination unit 23 determines whether intra-prediction processing with respect to the pixel block is executable. At this occasion, the determination unit 23 performs processing similar to that in the determination unit 13 according to the first example embodiment. The determination unit 23 notifies the intra-prediction unit 216 of the determination result.

The execution unit 21 includes a variable length encoding unit 210, an inverse-transformation inverse-quantization unit 211, a transformation quantization unit 212, a loop filter 213, a frame buffer 214, the inter-prediction unit 215, the intra-prediction unit 216, and a switch 217.

The inter-prediction unit 215 performs inter-prediction processing with respect to a selected inter-prediction block, similarly to the inter-prediction unit 114 according to the first example embodiment. More specifically, the inter-prediction unit 215 generates a prediction image indicating a result of inter-prediction processing, based on an encoded frame (image) stored in the frame buffer 214 to be described later, and the motion vector generated by the first cost calculation unit 24. The inter-prediction unit 215 updates an execution state, to "completed", stored in the storage unit 22 regarding the inter-prediction block, for which prediction processing is completed. The execution unit 21 generates a difference between the prediction image generated by the inter-prediction unit 215, and an input image, as a difference signal.

The intra-prediction unit 216 performs intra-prediction processing with respect to a selected intra-prediction block, similarly to the intra-prediction unit 115 according to the first example embodiment. More specifically, the intra-prediction unit 216 generates a prediction image indicating a result of performing intra-prediction processing by referring to a reconfigured image (to be described later) relating to an adjacent reference block. The intra-prediction unit 216 updates an execution state, to "completed", stored in the storage unit 22, regarding the intra-prediction block, for which prediction processing is completed. The execution unit 21 generates a difference between the prediction image generated by the intra-prediction unit 216, and an input image, as a difference signal.

It is assumed that the execution unit 21 is able to switch, as necessary, between the above-described inter-prediction processing and intra-prediction processing, by switching the switch 217 for switching an output relating to the inter-prediction unit 215 and the intra-prediction unit 216 depending on an encoding type of a pixel block as a processing target.

The transformation quantization unit 212 quantizes a transformation coefficient by performing orthogonal transformation with respect to the difference signal generated by the execution unit 21. The inverse-transformation inverse-quantization unit 211 performs inverse orthogonal transformation, after inverse quantization of the quantized transformation coefficient. The execution unit 21 generates a reconfigured image by adding a result of the inverse orthogonal transformation, and the prediction image generated by the inter-prediction unit 215 or the intra-prediction unit 216.

The variable length encoding unit 210 outputs a bitstream generated by encoding the transformation coefficient quantized by the transformation quantization unit 212. The loop filter 213 stores, in the frame buffer 214, a frame (image) generated by removing a block distortion of the reconfigured image generated by the execution unit 21.

Next, an operation (processing) of the moving image encoding device 20 according to the present example embodiment is described in detail with reference to the flowcharts of FIGS. 12 to 14.

Figure 12:
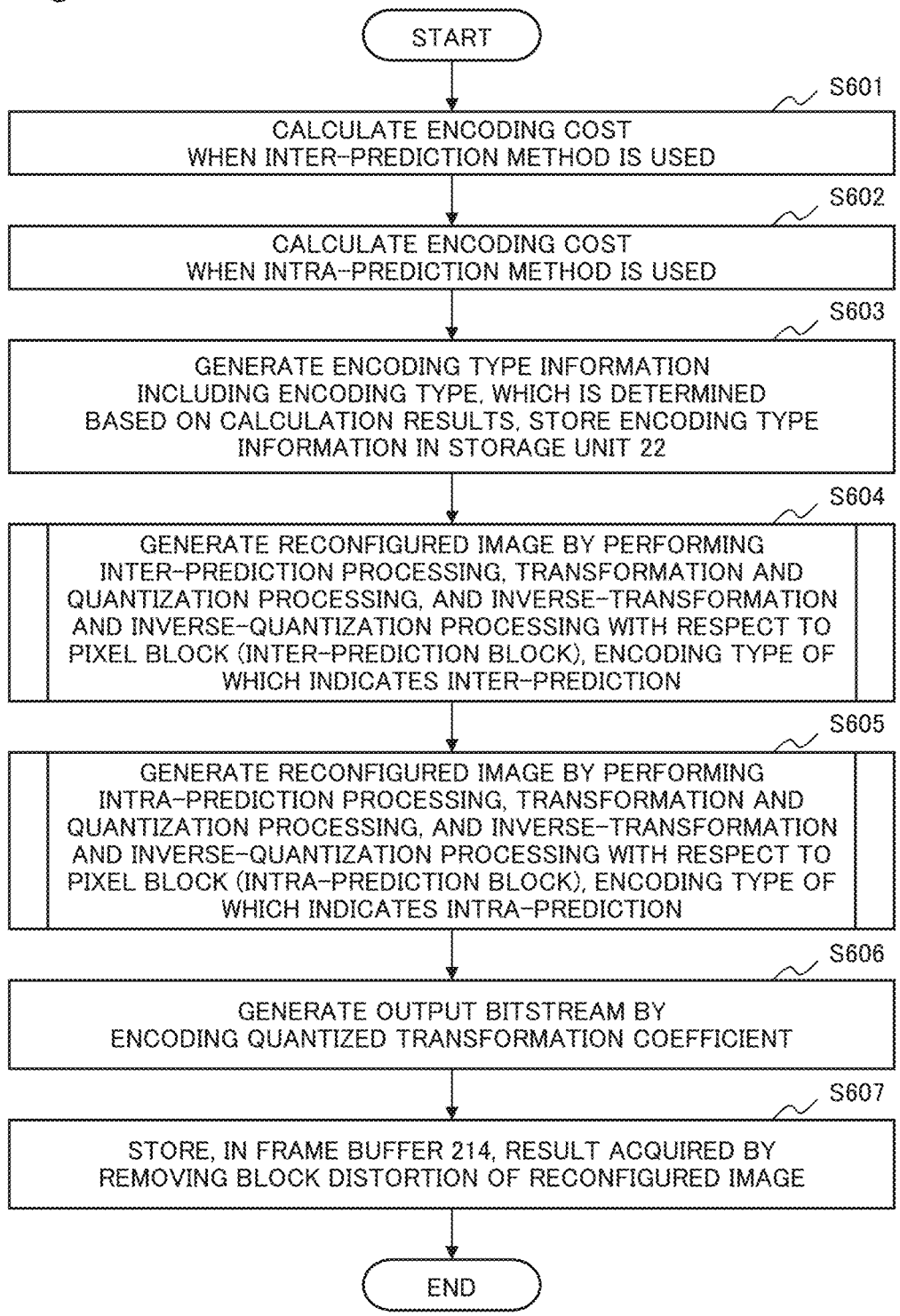
FIG. 12 is a flowchart illustrating an overall operation of the moving image encoding device 20 according to the fourth example embodiment of the invention of the present application.

FIG. 12 is a flowchart illustrating an overall operation of the moving image encoding device 20.

The first cost calculation unit 24 calculates an encoding cost when an inter-prediction method is used (Step S601). The second cost calculation unit 25 calculates an encoding cost when an intra-prediction method is used (Step S602). The generation unit 26 generates encoding type information including an encoding type, which is determined based on the calculation results by the first cost calculation unit 24 and the second cost calculation unit 25, and stores the encoding type information in the storage unit 22 (Step S603).

The execution unit 21 generates a reconfigured image by performing inter-prediction processing, transformation and quantization processing, and inverse-transformation and inverse-quantization processing with respect to a pixel block (inter-prediction block), an encoding type of which indicates inter-prediction (Step S604). The execution unit 21 generates a reconfigured image by performing intra-prediction processing, transformation and quantization processing, and inverse-transformation and inverse-quantization processing with respect to a pixel block (intra-prediction block), an encoding type of which indicates intra-prediction (Step S605).

The variable length encoding unit 210 in the execution unit 21 generates an output bitstream by encoding a transformation coefficient quantized by the transformation quantization unit 212 (Step S606). The loop filter 213 in the execution unit 21 stores, in the frame buffer 214, a result acquired by removing a block distortion of the reconfigured image generated by the execution unit 21 (Step S607), and the overall processing is ended.

Figure 13:
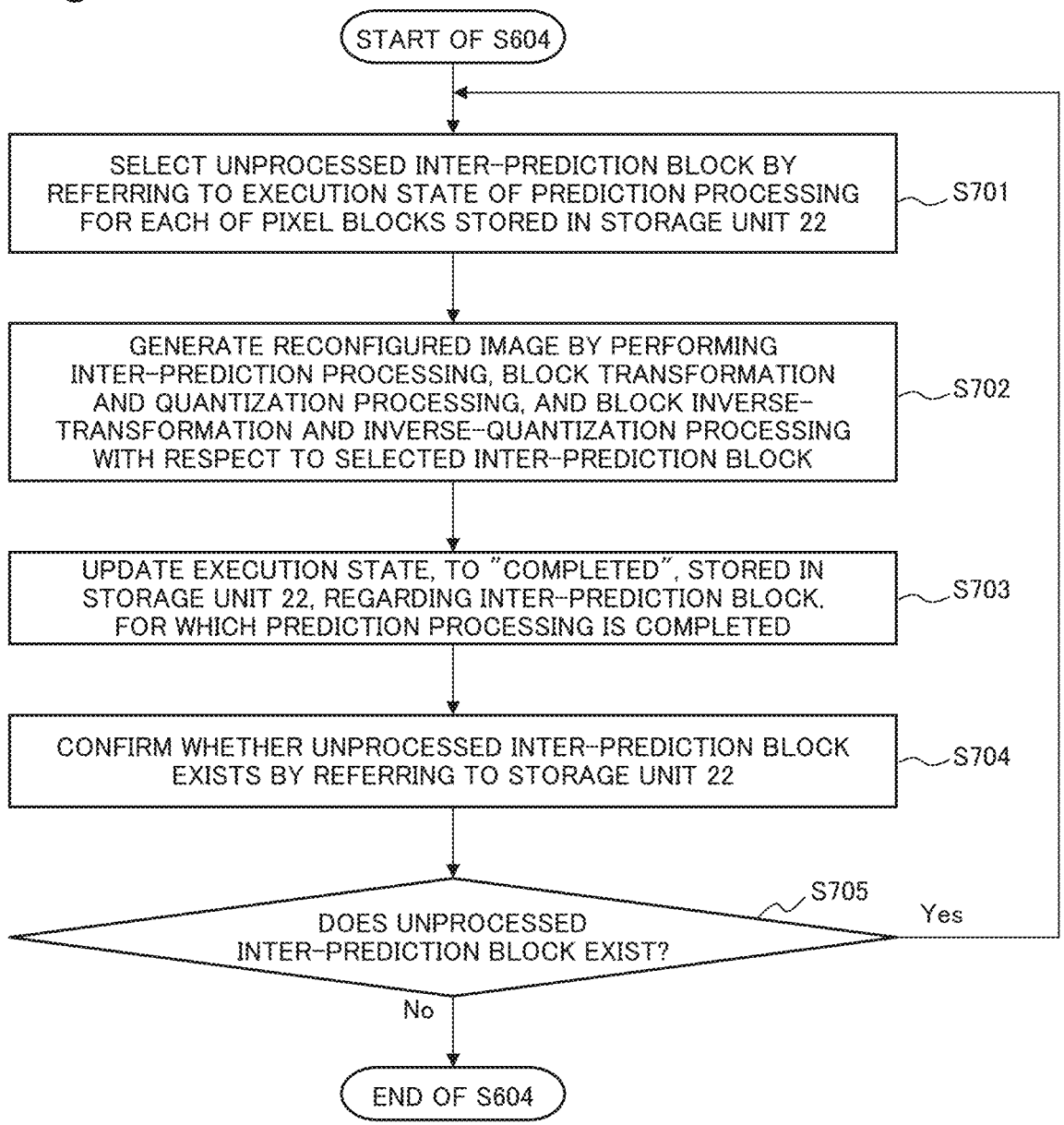
FIG. 13 is a flowchart illustrating details of an operation of performing prediction processing using an inter-prediction method with respect to a pixel block by the moving image encoding device 20 according to the fourth example embodiment of the invention of the present application.

FIG. 13 is a flowchart illustrating details of an operation of performing prediction processing using an inter-prediction method with respect to a pixel block by the moving image encoding device 20. Specifically, FIG. 13 is a flowchart illustrating details of Step S604 in the flowchart illustrated in FIG. 12.

The inter-prediction unit 215 in the execution unit 21 selects an unprocessed inter-prediction block by referring to an execution state of prediction processing for each of pixel blocks, which is stored in the storage unit 22 (Step S701). The execution unit 21 generates a reconfigured image by performing inter-prediction processing, block transformation and quantization processing, and block inverse-transformation and inverse-quantization processing with respect to the selected inter-prediction block (Step S702).

The inter-prediction unit 215 in the execution unit 21 updates an execution state, to "completed", stored in the storage unit 22, regarding the inter-prediction block, for which prediction processing is completed (Step S703). The inter-prediction unit 215 confirms whether an unprocessed inter-prediction block exists by referring to the storage unit 22 (Step S704).

When an unprocessed inter-prediction block exists (Yes in Step S705), the processing returns to Step S701. When an unprocessed inter-prediction block does not exist (No in Step S705), the processing of Step S604 is ended.

Figure 14:
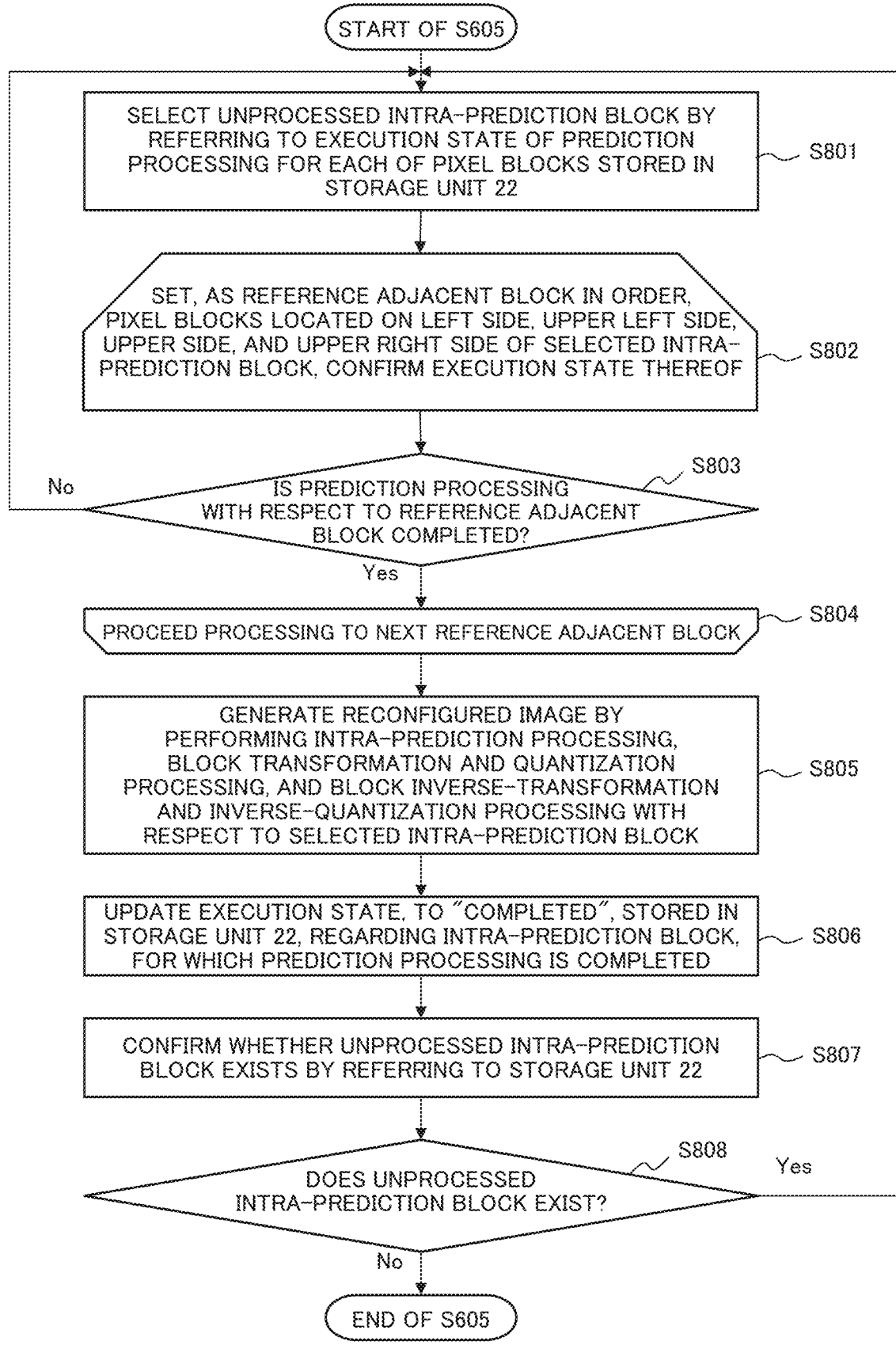
FIG. 14 is a flowchart illustrating details of an operation of performing prediction processing using an intra-prediction method with respect to a pixel block by the moving image encoding device 20 according to the fourth example embodiment of the invention of the present application.

FIG. 14 is a flowchart illustrating details of an operation of performing prediction processing using an intra-prediction method with respect to a pixel block by the moving image encoding device 20. Specifically, FIG. 14 is a flowchart illustrating details of Step S605 in the flowchart illustrated in FIG. 12.

The intra-prediction unit 216 in the execution unit 21 selects an unprocessed intra-prediction block by referring to an execution state of prediction processing for each of pixel blocks, which is stored in the storage unit 22 (Step S801). The determination unit 23 sets, as a reference adjacent block in an order, pixel blocks located on a left side, an upper left side, an upper side, and an upper right side of the intra-prediction block selected by the intra-prediction unit 216, and confirms an execution state thereof (Step S802).

When prediction processing with respect to the reference adjacent block is not completed (No in Step S803), the processing returns to Step S801. When prediction processing with respect to the reference adjacent block is completed (Yes in Step S803), the determination unit 23 performs loop processing from Step S802 regarding a next reference adjacent block, and when processing with respect to all the reference adjacent blocks is completed, the processing proceeds to Step S805 (Step S804).

The execution unit 21 generates a reconfigured image by performing intra-prediction processing, block transformation and quantization processing, and block inverse-transformation and inverse-quantization processing with respect to the selected intra-prediction block (Step S805). The intra-prediction unit 216 updates an execution state, to "completed", stored in the storage unit 22, regarding the intra-prediction block, for which prediction processing is completed (Step S806).

The intra-prediction unit 216 confirms whether an unprocessed intra-prediction block exists by referring to the storage unit 22 (Step S807). When an unprocessed intra-prediction block exists (Yes in Step S808), the processing returns to Step S801. When an unprocessed inter-prediction block does not exist (No in Step S808), the processing of Step S605 is ended.

The moving image encoding device 20 according to the present example embodiment is able to accelerate encoding processing with respect to a moving image. A reason for this is as described in relation to the first example embodiment.

Further, the moving image encoding device 20 according to the present example embodiment may be a device to which a configuration (technique) included in the moving image decoding device 10A according to the second example embodiment, or the moving image decoding device 10B according to the third example embodiment is applied.

Fifth Example Embodiment

Figure 15:
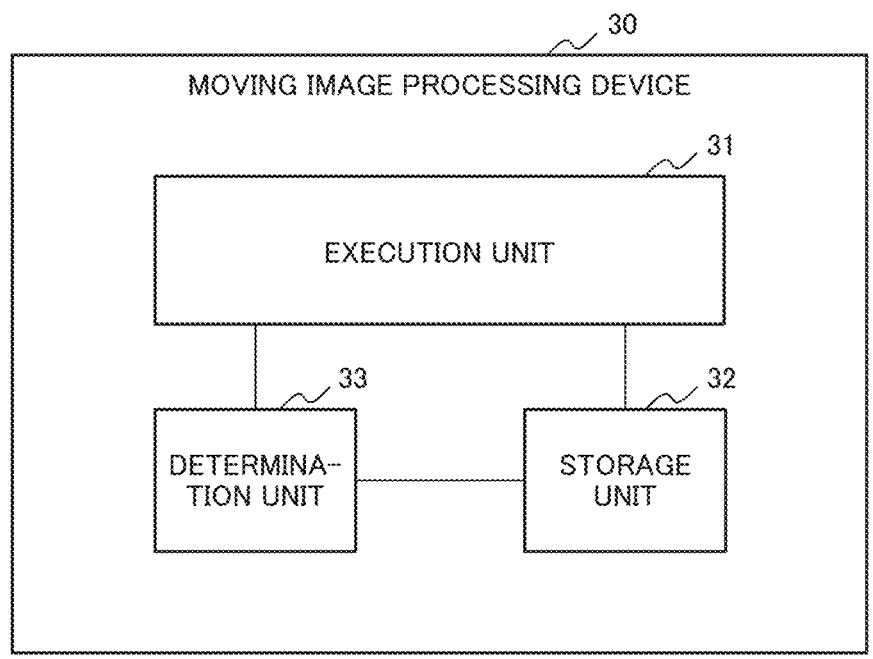
FIG. 15 is a block diagram illustrating a configuration of a moving image processing device 30 according to a fifth example embodiment of the invention of the present application.

FIG. 15 is a block diagram conceptually illustrating a configuration of a moving image processing device 30 according to a fifth example embodiment of the invention of the present application.

The moving image processing device 30 according to the present example embodiment includes an execution unit 31, a storage unit 32, and a determination unit 33.

The storage unit 32 stores, by dividing an image into a plurality of pixel blocks and performing image processing with respect to the individual pixel blocks, an execution state of the image processing for each of the pixel blocks, when encoding processing or decoding processing with respect to the image is performed.

The determination unit 33 determines whether image processing with respect to a first pixel block is executable, based on an execution state, stored in the storage unit 32, of image processing with respect to a second pixel block for which image processing with respect to the first pixel block has a dependence regarding a processing order.

The execution unit 31 performs, in parallel or pseudo-parallel, image processing with respect to a plurality of the first pixel blocks for which image processing is determined to be executable by the determination unit 33. The execution unit 31 further updates an execution state, stored in the storage unit 32, of image processing with respect to the first pixel block.

The moving image processing device 30 according to the present example embodiment is able to accelerate image processing with respect to a moving image. A reason for this is that, when a first pixel block has a dependence with respect to a second pixel block regarding a processing order in relation to image processing, it is possible to detect that the dependence is cancelled at an early timing by managing an execution state of image processing for each of pixel blocks, and as a result of the detection, accelerate start of image processing with respect to the first pixel block.

Hardware Configuration Example

In the above-described example embodiments, it is possible to achieve each unit in the moving image decoding device 10 (10A, 10B) illustrated in FIG. 1, the moving image encoding device 20 illustrated in FIG. 11, and the moving image processing device 30 illustrated in FIG. 15 by a dedicated hardware (HW) (electronic circuit). Further, in FIGS. 1, 11, and 15, at least the following components can be regarded as function (processing) units (software modules) of a software program.

The execution units 11 (11B), 21, and 31,
  a storage control function in the storage units 12 (12A, 12B), 22, and 32,
  the determination units 13 (13A, 13B), 23, and 33,
  the first cost calculation unit 24,
  the second cost calculation unit 25, and
  the generation unit 26.

However, classification of the units illustrated in the drawings is a configuration for convenience of explanation, and when the units are actually implemented, various configurations may be proposed. One example of a hardware environment in this case is described with reference to FIG. 16.

Figure 16:
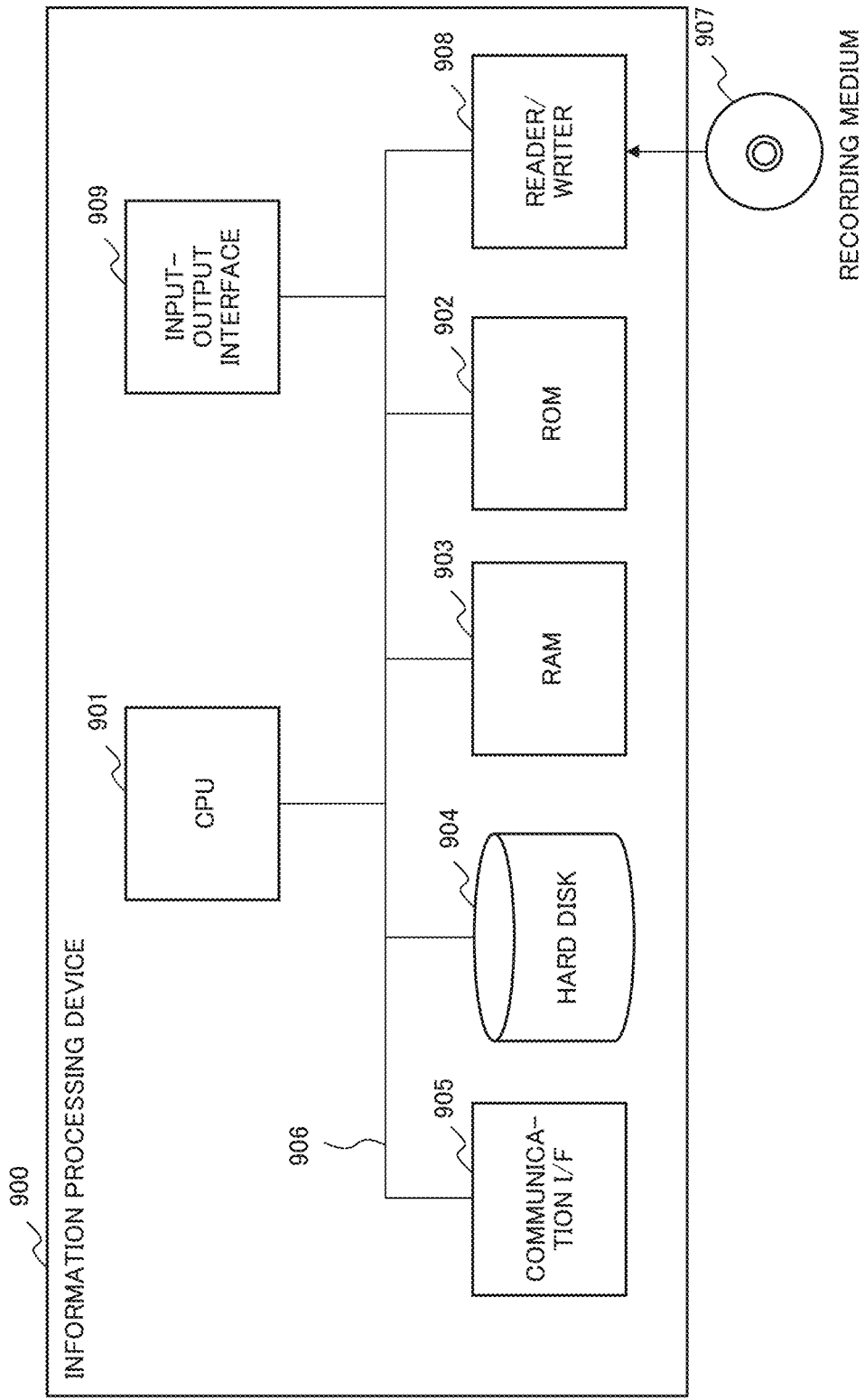
FIG. 16 is a block diagram illustrating a configuration of an information processing device 900 capable of operating the moving image decoding device 10 (10A, 10B), the moving image encoding device 20, and the moving image processing device 30 according to the example embodiments of the invention of the present application.
Figure 17:
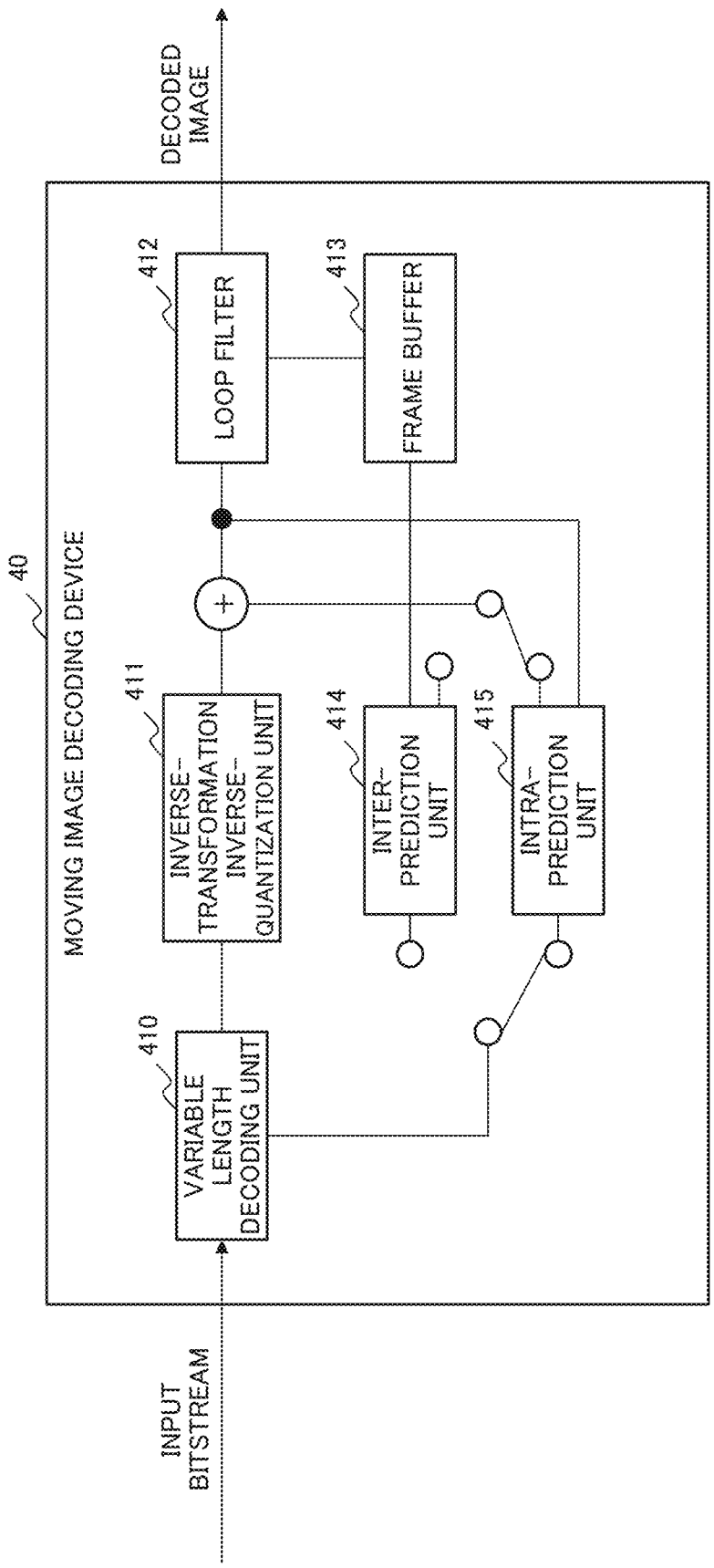
FIG. 17 is a block diagram illustrating a configuration of a general moving image decoding device 40.

FIG. 16 is a diagram exemplarily illustrating a configuration of an information processing device 900 (computer) capable of operating the moving image decoding device 10 (10A, 10B), the moving image encoding device 20, and the moving image processing device 30 according to the example embodiments of the invention of the present application. Specifically, FIG. 16 illustrates a configuration of a computer (information processing device) capable of achieving the moving image decoding device 10 (10A, 10B), the moving image encoding device 20, and the moving image processing device 30 illustrated in FIGS. 1, 11, and 15, or a part thereof, and a hardware environment capable of achieving the functions in the above-described example embodiments. The information processing device 900 illustrated in FIG. 16 includes the following as constituent elements.

A central processing unit (CPU) 901,
a read only memory (ROM) 902,
a random access memory (RAM) 903,
a hard disk (storage device) 904,
a communication interface 905 to an external device,
a bus 906 (communication line),
a reader/writer 908 capable of reading and writing data stored in a recording medium 907 such as a compact disc read only memory (CD-ROM), and
an input-output interface 909.

Specifically, the information processing device 900 including the above-described constituent elements is a general computer to which the components are connected via the bus 906. The information processing device 900 may include a plurality of CPUs 901, or may include a CPU 901 configured by a multiple core. Alternatively, the information processing device 900 may have a configuration in which a general-purpose CPU serving as a main component, and a hardware accelerator specialized for a specific arithmetic processing are cooperated with each other in such a way as to perform a plurality of processing in parallel.

Further, the invention of the present application described by the above-described example embodiments as an example supplies, to the information processing device 900 illustrated in FIG. 16, a computer program capable of achieving the following function. The function is a function of the above-described configuration in the block configuration diagrams (FIGS. 1, 11, and 15), or the flowcharts (FIGS. 2 to 4, 7, 10, and 12 to 14), which are referred to in describing the example embodiments. The invention of the present application, thereafter, is achieved by reading the computer program on the CPU 901 of the hardware, interpreting, and executing. Further, the computer program supplied to the device may be stored in a readable and writable volatile memory (RAM 903), or a non-volatile storage device such as the ROM 902 or the hard disk 904.

Further, in the above case, nowadays, a general procedure can be used as a method for supplying the computer program to the hardware. The procedure is, for example, a method of installing the computer program in the device via various recording media 907 such as a CD-ROM, a method of downloading the computer program from the outside via a communication line such as the Internet, or the like. Further, in this case, the invention of the present application can be regarded as being configured by codes constituting the computer program, or the recording medium 907 storing the codes.

In the foregoing, the invention of the present application is described by using the above-described example embodiments as an exemplary example. The invention of the present application, however, is not limited to the above-described example embodiments. Specifically, the invention of the present application can be applied various aspects comprehensible to a person skilled in the art within the scope of the invention of the present application.

This application is based upon and claims the benefit of priority from Japanese patent application No. 2017-077532, filed on Apr. 10, 2017, the disclosure of which is incorporated herein in its entirety by reference.

REFERENCE SIGNS LIST

10 Moving image decoding device
11 Execution unit
110 Variable length decoding unit
111 Inverse-transformation inverse-quantization unit
112 Loop filter
113 Frame buffer
114 Inter-prediction unit
115 Intra-prediction unit
116 and 117 Switch
12 Storage unit
13 Determination unit
20 Moving image encoding device
21 Execution unit
210 Variable length encoding unit
211 Inverse-transformation inverse-quantization unit
212 Transformation quantization unit
213 Loop filter
214 Frame buffer
215 Inter-prediction unit
216 Intra-prediction unit
217 Switch
22 Storage unit
23 Determination unit
24 First cost calculation unit
25 Second cost calculation unit
30 Moving image processing device
31 Execution unit
32 Storage unit
33 Determination unit
40 Moving image decoding device
410 Variable length decoding unit
411 Inverse-transformation inverse-quantization unit
412 Loop filter
413 Frame buffer
414 Inter-prediction unit
415 Intra-prediction unit
900 Information processing device
901 CPU
902 ROM
903 RAM
904 Hard disk (storage device)
905 Communication interface
906 Bus
907 Recording medium
908 Reader/writer
909 Input-output interface

What is claimed is:

1. A moving image processing device comprising:
a storage storing, by dividing an image into a plurality of pixel blocks and performing image processing with respect to the individual pixel blocks, an execution state of the image processing for each of the pixel blocks, when encoding processing or decoding processing with respect to the image is performed, and storing, for each of the pixel blocks, encoding type information indicating which either an inter-prediction method of generating a prediction image, based on timewise correlation, or an intra-prediction method of generating the prediction image, based on spatial correlation is used, as the image processing with respect to the pixel block;
at least one memory storing a computer program; and
at least one processor configured to execute the computer program to:
determine that the image processing with respect to a first pixel block is executable, when the encoding type information indicates using the intra-prediction method, and a second pixel block for which the execution state of the image processing is not completed does not exist, the second block being adjacent to the first pixel block;
perform, in parallel or pseudo-parallel, the image processing with respect to a plurality of the first pixel blocks for which the image processing is determined to be executable by the processor, the image processing being generating the prediction image relating to the first pixel block, by using information indicating the second pixel block; and
update the execution state, stored in the storage, of the image processing with respect to the first pixel block.

2. The moving image processing device according to claim 1, wherein the processor is configured to execute the computer program to:
calculate an encoding cost when the inter-prediction method is used, as the image processing with respect to the pixel block;
calculate an encoding cost when the intra-prediction method is used, as the image processing with respect to the pixel block;
generate the encoding type information for each of the pixel blocks, based on calculation results by the processor; and
store the encoding type information being generated in the storage.

3. The moving image processing device according to claim 1, wherein
the storage stores, for each of the pixel blocks, a value indicating an intra-prediction mode for deciding the second pixel block being adjacent to the first pixel block in the intra-prediction method, and
the processor is configured to execute the computer program to:
refer to the execution state of the image processing with respect to the second pixel block to be decided by the value indicating the intra-prediction mode.

4. The moving image processing device according to claim 1, wherein
the storage stores, for each of the pixel blocks, a value indicating the dependence relating to the first pixel block and the second pixel block for which the intra-prediction method is used, before the encoding processing or the decoding processing with respect to the image is started, and
the processor is configured to execute the computer program to:
update the value indicating the dependence relating to the first pixel block, each time when the image processing with respect to any of the second pixel blocks is completed; and
determine that the image processing with respect to the first pixel block is executable, when the value indicating the dependence relating to the first pixel block indicates that the second pixel block for which the image processing is not completed does not exist.

5. The moving image processing device according to claim 4, wherein the processor is configured to execute the computer program to:

before the encoding processing or the decoding processing with respect to the image is started, calculate the value indicating the dependence relating to the pixel block for which the image processing using the intra-prediction method is performed; and store the value being calculated indicating the dependence in the storage.

6. The moving image processing device according to claim 1, wherein the processor is configured to execute the computer program to:

perform the image processing conforming to any of standard specifications relating to moving image encoding including H.264 and H.265.

7. A moving image processing method comprising:

by an information processing device, storing, in a storage, by dividing an image into a plurality of pixel blocks and performing image processing with respect to the individual pixel blocks, an execution state of the image processing for each of the pixel blocks, when encoding processing or decoding processing with respect to the image is performed;

storing, for each of the pixel blocks, encoding type information indicating which either an inter-prediction method of generating a prediction image, based on timewise correlation, or an intra-prediction method of generating the prediction image, based on spatial correlation is used, as the image processing with respect to the pixel block;

determining that the image processing with respect to a first pixel block is executable, when the encoding type information indicates using the intra-prediction method, and a second pixel block for which the execution state of the image processing is not completed does not exist, the second block being adjacent to the first pixel block;

performing, in parallel or pseudo-parallel, image processing with respect to a plurality of the first pixel blocks for which the image processing is determined to be executable, the image processing being generating the prediction image relating to the first pixel block, by using information indicating the second pixel block; and updating the execution state, stored in the storage, of the image processing with respect to the first pixel block.

8. A non-transitory computer-readable recording medium storing a moving image processing program causing a computer to execute:

storing, in a storage, by dividing an image into a plurality of pixel blocks and performing image processing with respect to the individual pixel blocks, an execution state of the image processing for each of the pixel blocks, when encoding processing or decoding processing with respect to the image is performed;

storing, for each of the pixel blocks, encoding type information indicating which either an inter-prediction method of generating a prediction image, based on timewise correlation, or an intra-prediction method of generating the prediction image, based on spatial correlation is used, as the image processing with respect to the pixel block;

determining that the image processing with respect to a first pixel block is executable, when the encoding type information indicates using the intra-prediction method, and a second pixel block for which the execution state of the image processing is not completed does not exist, the second block being adjacent to the first pixel block;

performing, in parallel or pseudo-parallel, the image processing with respect to a plurality of the first pixel blocks for which the image processing is determined to be executable by the determination processing, the image processing being generating the prediction image relating to the first pixel block, by using information indicating the second pixel block; and updating the execution state, stored in the storage, of the image processing with respect to the first pixel block.

\* \* \* \* \*